US006965926B1

(12) United States Patent
Shapiro et al.

(10) Patent No.: US 6,965,926 B1
(45) Date of Patent: Nov. 15, 2005

(54) METHODS AND SYSTEMS FOR RECEIVING AND VIEWING CONTENT-RICH COMMUNICATIONS

(75) Inventors: Aaron M. Shapiro, Atlanta, GA (US); Theodore John Roberts, Jr., Marietta, GA (US)

(73) Assignee: Silverpop Systems, Inc., Atlanta, GA (US)

( * ) Notice: Subject to any disclaimer, the term of this patent is extended or adjusted under 35 U.S.C. 154(b) by 0 days.

(21) Appl. No.: 09/545,653

(22) Filed: Apr. 10, 2000

(51) Int. Cl.[7] .............................................. G06F 13/00
(52) U.S. Cl. ...................... 709/219; 709/206; 709/226; 709/229
(58) Field of Search .............................. 709/201, 202, 709/203, 217, 219, 231, 328, 329, 206, 225, 709/226, 229; 719/328, 329

(56) References Cited

U.S. PATENT DOCUMENTS

| 5,771,355 | A | * | 6/1998 | Kuzma ........................ 709/206 |
| 5,781,901 | A | | 7/1998 | Kuzma ........................ 707/10 |
| 5,996,007 | A | * | 11/1999 | Klug et al. .................. 709/218 |
| 6,014,688 | A | * | 1/2000 | Venkatraman et al. ...... 709/206 |
| 6,108,703 | A | * | 8/2000 | Leighton et al. ............ 709/226 |
| 6,223,209 | B1 | * | 4/2001 | Watson ....................... 709/201 |
| 6,223,213 | B1 | * | 4/2001 | Cleron et al. ............... 709/206 |
| 6,304,909 | B1 | * | 10/2001 | Mullaly et al. ............. 709/232 |
| 6,311,221 | B1 | * | 10/2001 | Raz et al. ................... 709/231 |
| 6,430,177 | B1 | * | 8/2002 | Luzeski et al. ............. 370/356 |
| 6,449,647 | B1 | * | 9/2002 | Colby et al. ................ 709/226 |
| 6,735,741 | B1 | * | 5/2004 | Pannu ......................... 715/530 |

FOREIGN PATENT DOCUMENTS

WO      WO 01/41393      6/2001

OTHER PUBLICATIONS

Annoymous, *Introducing Videoshare.com*, Online!, Mar. 8, 2000.
Computer Communications, vol. 18 No. 2, Feb. 1995, Title: "The BERKOM Multimedia-Mail Teleservice" by Eckhard Moeller, Sanjay Manandhar, Luc Neumann, Johannes Ruckert, Gerd Schurmann, Susan Thomas and Frieder Wolf, pp. 89-102.

* cited by examiner

*Primary Examiner*—Viet D. Vu
(74) *Attorney, Agent, or Firm*—Finnegan Henderson Farabow Garrett & Dunner, LLP

(57) ABSTRACT

Methods, systems, and articles of manufacture consistent with the present invention provide the ability to receive a communication (such as an electronic mail message) using a particular content server within a network. A minimal amount of information is received, such as an instruction set and a basic amount of content information. The instruction set is analyzed to determine references to content stored on a particular one of the content servers, namely the content server that is closest to an anticipated access point for the communication. While executing the instruction set and displaying the basic content information, a request for the communication's content is generated and sent to the content server. The content is received from the content server closest to the anticipated access point (typically the one closest to the requesting node), usually in a streaming format. The content is then displayed for the intended recipient.

18 Claims, 17 Drawing Sheets

METHODS AND SYSTEMS FOR RECEIVING AND VIEWING CONTENT-RICH COMMUNICATIONS

RELATED APPLICATIONS

This patent application is related to a series of other patent applications simultaneously filed with the present application on Apr. 10, 2000. Those other patent applications include U.S. patent application Ser. No. 09/545,652, entitled "METHODS AND SYSTEMS FOR COMPOSING AND TRANSMITTING CONTENT-RICH COMMUNICATIONS" and U.S. patent application Ser. No. 09/545,649, entitled "METHODS AND SYSTEMS FOR PROCESSING THE CONTENT OF CONTENT-RICH COMMUNICATIONS." This patent application and the noted other patent applications have common inventors and are assigned to a common entity.

TECHNICAL FIELD

This invention relates to systems for distributed delivery of content-rich communications and, more particularly, to methods and systems for receiving and viewing a content-rich electronic mail message using a network of content servers.

BACKGROUND OF THE INVENTION

With the rapid growth of the global Internet, the basic idea of two computers communicating over a network has evolved into a vest network of user nodes, routers, bridges, and servers. Electronic mail over such a network is rapidly becoming the preferred way many people communicate with others. Electronic mail facilitates communicating with those in the next room, in the house next door and across the globe in another country. It has become a staple means of communication in the business environment as well as at home. For example, business memos are now often sent via text within an electronic mail message ("email") and at the same time greatly anticipated news of a newborn may be sent to relatives in many different locations using email.

Email of today is typically text-only with the ability to add content via file attachments. Email is conventionally transmitted and received using standard mail protocols, such as Simple Mail Transfer Protocol (SMTP) and Post Office Protocol (POP), respectively. SMTP is a protocol for sending email messages between mail servers within a network. Most email systems that send email over the global Internet use SMTP to send messages from one mail server to another. The email messages are retrieved using POP or other mail protocols, such as the newer Internet Message Access Protocol (IMAP).

One of the problems with today's conventional email delivery paradigm is that email is delivered in bulk from the sender's email program to a mail server on the network, and then finally to the intended recipient's mail server and mail client as a single, discrete transmission. When a sender desires to send a message with multimedia content, the sender is usually required to include the multimedia content as a separate file attachment to the email message. Given that such content is relatively large, this forces the email message to become undesirably large and requires an annoying amount of time to download. Furthermore, the core text message is not allowed to become an integrated part of a multimedia content viewed by the intended recipient.

Several companies are known to offer users a limited ability to enhance email messages with some form of rich media content. Rockettalk, Signaturemail and some electronic greeting card services, such as Blue Mountain Arts, provide customers with such a limited ability to enhance email with content, but all rely upon file attachments or hyperlinks to web pages outside the confines of the email message.

Rockettalk provides a service that allows users to record audio content and email that content as the message itself. However, the resulting email message cannot include any other multimedia content or even text. This is considered by some to be a less than robust solution to providing rich content messaging. Additionally, if the audio message is lengthy, the email message itself grows to an undesirable size.

Signaturemail provides a service that allows content as part of an email message by facilitating the inclusion of a signature block on the bottom of an email or sending a voice message by email. Unfortunately, this is only a single feature set instead of a robust tool that can integrate a variety of multimedia content elements into an email message. Furthermore, including such content as part of the message (i.e., a file attachment) still allows the message to grow to a burdensome and undesirable size for downloading.

Others have attempted to send multimedia content with HTML direct marketing solutions using email. For example, companies such as Messagemedia, Exactis, and Digital Impact are known to offer comprehensive direct marketing solutions using HTML files emailed to prospective customers. However, simply including the HTML file along with the multimedia content attached to the email message does not resolve the issue with delivering large, content-rich messages.

Another possible solution has been to send such large, content-rich information in multiple pieces through the network and re-assemble it on the intended recipient's system. A new markup language called Synchronized Multimedia Integration Language (SMIL) enables Web developers to divide multimedia content into separate files and streams (audio, video, text, and images), send them to a user's computer individually, and then have them displayed together as if they were a single multimedia stream. SMIL is based upon eXtensible Markup Language (XML) and is related to how web content can be delivered. However, SMIL is focused on web serving and not individual communications or email messaging. Furthermore, it still requires an undesirably large email message (albeit in parts) to be received by the intended recipient. The same information is required to be downloaded through the network's mail servers and then reassembled causing the need for additional processing and annoying wait periods on the recipient's end.

Additionally, Radical Mail is known to offer a bulk mail solution that stages content on a server within the network and then bulk mails messages that provide a link or reference to that content. However, Radical Mail does not allow for individual communication content to be dynamically and intelligently positioned within the network.

One company, called Akamai Technologies of Cambridge, Mass., has discovered a way in which to deliver multimedia content in a distributed fashion for use by users logging into websites. Essentially, Akamai provides distributed web caches of content so that users are not logging into a single web content server and causing congestion and poor interactive performance when many users attempt to access the single web content server. The content distributed to Akamai's servers is static and broadcast to multiple servers. In this manner, the serving load is distributed to avoid congestion of a single web server and ultimately to improve the interactive performance of the website. When a user requests the content of such a website, the Akamai system intelligently determines which of the multiple copies of the content stored on Akamai servers to access for delivery to the user.

Unfortunately, the Akamai model of having the same static content maintained on multiple servers for delivery to a requesting user does not resolve the problems noted above with content-rich email message delivery. First, the Akamai model is focused on web content delivery and does not readily translate into a solution for email message delivery. For most email messages, the multimedia content associated with the message is only used once or twice by a potential recipient. The Akamai model becomes problematic for email content used that is only infrequently used because redundantly placing the multimedia content of a large number of email messages onto a large number of servers is time consuming, memory wasteful, and inefficient. Memory storage for each server and network bandwidth is simply wasted broadcasting all of this multimedia content out when it is only used a few times.

Accordingly, there remains a need for delivering content that is less frequently used. More particularly, there is a need for methods and systems that provide a comprehensive solution for receiving and viewing content-rich communications and messages that enable efficient delivery of such messages while avoiding the need for large downloads and issues with latency.

SUMMARY OF THE INVENTION

Methods, systems and articles of manufacture consistent with the present invention overcome the shortcomings of existing systems by using one or more dynamic content servers in a network to improve how content-rich messages are created, delivered, and viewed. Methods, systems, and articles of manufacture consistent with the present invention, as embodied and broadly described herein, include a method for receiving content (such as multimedia content—audio, video, images, etc.) of a communication (such as an electronic mail message) within a network. First, information associated with the communication is received. This information references content stored on one of a group of content servers within the network. The particular content server maintaining the referenced content is the one that is closest to an anticipated access point for the communication. The received information may be analyzed to determine an instruction set associated with the communication. The instruction set may have at least one reference to the content. The instruction set may then be executed to display an initial part of the communication.

Next, the referenced content is accessed on the content server closest to the anticipated access point before the communication is displayed using the received information and the accessed content. Accessing the content is typically accomplished by requesting the content in response to executing the instruction set. Requesting may be accomplished by generating a request for the content and sending the request to the content server closest to the anticipated access point for the communication within the network.

In response to the request, the content is received from that closest content server usually in a streaming format. More particularly stated, a stream of data may be received representing the content and processing the received stream of data before displaying the received stream of data within the communication.

In accordance with yet another aspect of the present invention, methods, systems, and articles of manufacture, as embodied and broadly described herein, describe a system in a network for receiving a communication (such as an electronic mail message) using a group of content servers within the network. The system has a processor, a display device coupled to the processor, and a communications interface coupling the processor to the network. The processor can receive information associated with the communication. This information references content stored on one of the content servers that is closest to an anticipated access point (such as the receiving node) for the communication. For an electronic mail message, the anticipated access point is where the intended recipient of the message (more generally the communication) is likely to access the message.

Typically, the processor is able to interpret the received information to identify the referenced content. The processor is also able to access the referenced content on the content server through the communications interface and then cause the communication to be displayed on the display device using the received information and the accessed content.

More specifically, the processor may determine an instruction set based upon the received information. This instruction set is typically associated with the communication and has at least one reference to the content. The processor can then execute the instruction set to cause an initial part of the communication to be displayed on the display device. The processor may then generate a request for the content and send the request to the content server closest to the anticipated access point through the communications interface. The communication interface is typically able to receive the requested content in a predefined streamed format from that closest content server and then provide the content in the predefined streamed format to the processor. The processor may then receive the content from the communications interface and process the content to cause the content to be displayed on the display device.

In accordance with still another aspect of the present invention, methods, systems, and articles of manufacture, as embodied and broadly described herein, describe a computer-readable medium, which contains instructions for receiving a communication using a content server within the network. When the instructions are executed, at least one reference to content associated with the communication is received. The content is stored on one of the content servers within the network that is closest to an anticipated access point for the communication. Next, a basic amount of information associated with the communication is received before a first part of the communication is displayed using that basic amount of information. When displaying the first part of the communication, a background color, an animation or a graphical representation of information on the sender is usually displayed.

The content on the closest content server is then accessed using reference to the content before a second part of the communication is displayed using the accessed content. More specifically, a request for the content is generated based upon reference to the content. The request is then sent to the content server closest to the anticipated access point and subsequently the content is received back from that content server. Typically, the content is received in a predefined streaming format.

BRIEF DESCRIPTION OF THE DRAWINGS

The accompanying drawings, which are incorporated in and constitute a part of this specification, illustrate an implementation of the invention. The drawings and the description serve to explain the advantages and principles of the invention. In the drawings, FIG. 1, consisting of FIGS. 1A–1G, are computer screen shot illustrations showing how a front-end client application is used to create and transmit a dynamic content-rich email message consistent with an embodiment of the present invention.

DETAILED DESCRIPTION

Figure 1A:
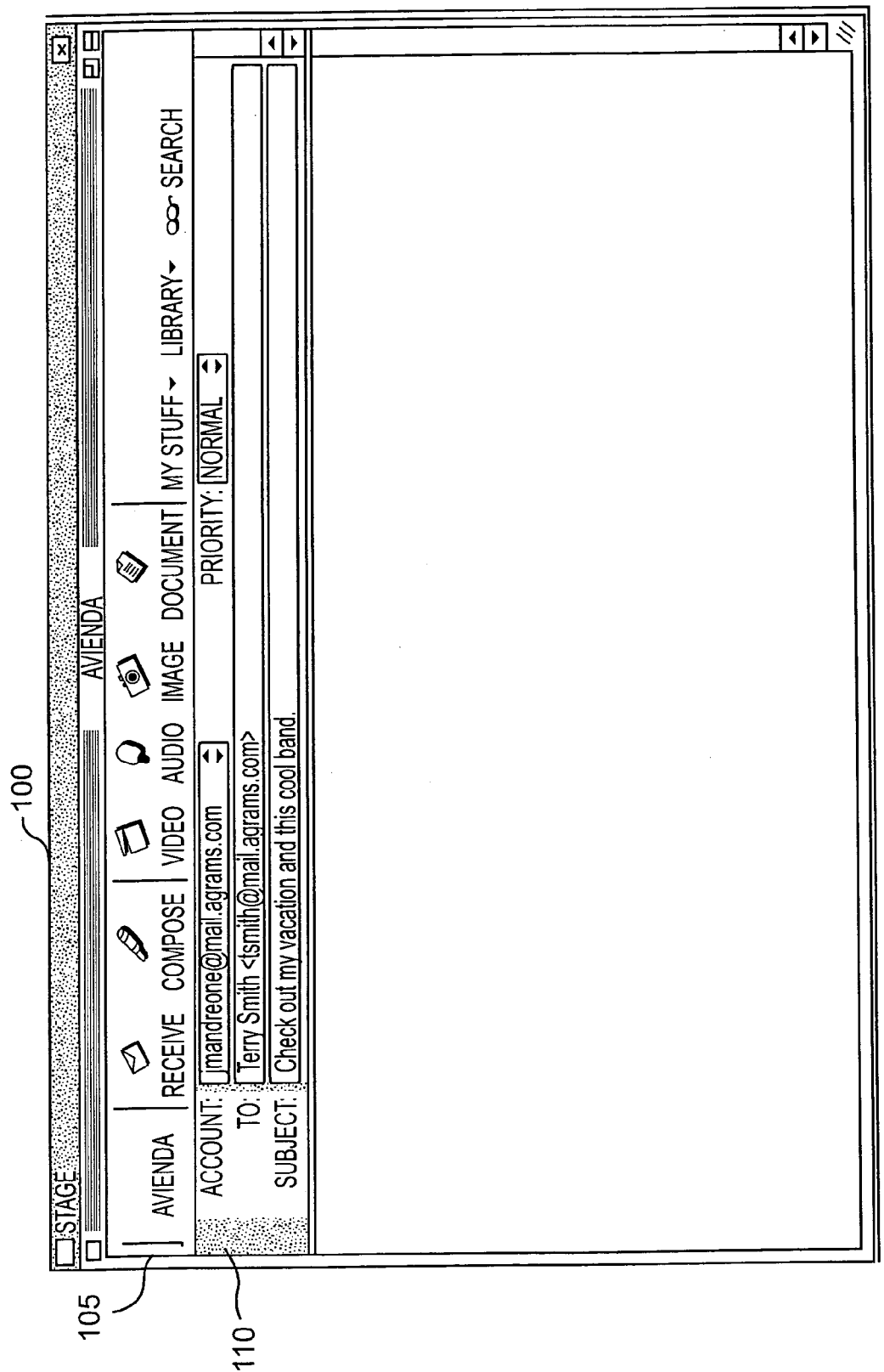

Reference will now be made in detail to an implementation consistent with the present invention as illustrated in the accompanying drawings. Wherever possible, the same reference numbers will be used throughout the drawings and the following description to refer to the same or like parts.

Introduction

In general, methods and systems in an embodiment consistent with the present invention use a front-end client-side messaging interface that, when advantageously combined with a back-end dynamic content server, fundamentally changes how content-rich communications can be created, delivered, and viewed. The front-end client software can used as a standalone module or coupled with an existing software module (such as an existing mail program) to enhance the functionality of the existing software module when composing and sending content-rich communications. The front-end client software is capable of controlling peripherals, such as scanners, digital cameras, video recorders, and sound recording devices. This allows a user to easily capture and access multimedia data, such as personal videos, sounds, or scanned images, for incorporation into a communication.

While the communication (such as an enhanced email message) is being composed on the screen, content elements of the communication are cleverly streamed out to the dynamic content server instead of actually attaching them to the communication. The dynamic content server stores the content in an optimized location within the network to make it quickly and easily accessible to the intended recipient.

When the communication is sent to the intended recipient, only a minimal amount of information is actually transferred up front. This minimal amount of information typically includes some basic content and instructions referencing the content maintained on the dynamic content server.

When the intended recipient receives the communication (such as the enhanced email message), the communication advantageously has a small memory footprint allowing for quick downloads avoiding undesirable delays. When the intended recipient views the communication, the receiving software interprets information sent within the communication to access the appropriate content on the dynamic content server, which responsively streams the content into the body of the communication in a seamless fashion. The intended recipient is left with a robust communication experience without the problems of dealing with large file downloads, non-integrated multimedia content, and latency issues.

It should be understood by those skilled in the art that use of the term "message" and "communication" broadly encompasses any mechanism permitting two systems or even two distinct software modules to pass information from one to the other. Examples of such "messages" or "communications" include but are not limited to electronic mail messages; serial or parallel communications between devices; packets; modulated radio frequency signals; infrared signals; modulated light on a fiber optic network, etc.

User Interface

An understanding of an embodiment of the present invention can be enhanced by describing what a user perceives when using systems consistent with an embodiment of the present invention where the communication is represented as an enhanced email message. FIG. 1, which includes FIGS. 1A–1G, is a series of exemplary computer screen shot illustrations showing how a front-end client application is used to compose a dynamic content-rich communication (such as an enhanced email message) consistent with an embodiment of the present invention. FIG. 2 and FIGS. 3A–3E are a series of exemplary computer screen shots illustrating how the content-rich message appears in an inbox and how it appears when opened for viewing by the intended recipient.

Referring now to FIG. 1A, a window 100 is illustrated that is displayed on a computer monitor. Window 100 is typically generated by a front-end client application program that controls computer peripherals (such as digital cameras, images scanners, video capture devices, etc.) and helps the user create a content-rich email message. At the top of window 100 is a menu bar 105 above a series of message fields 110 for entering who the email message is from, where it is going (the email address of the intended recipient) and a subject line for the message.

Figure 1B:
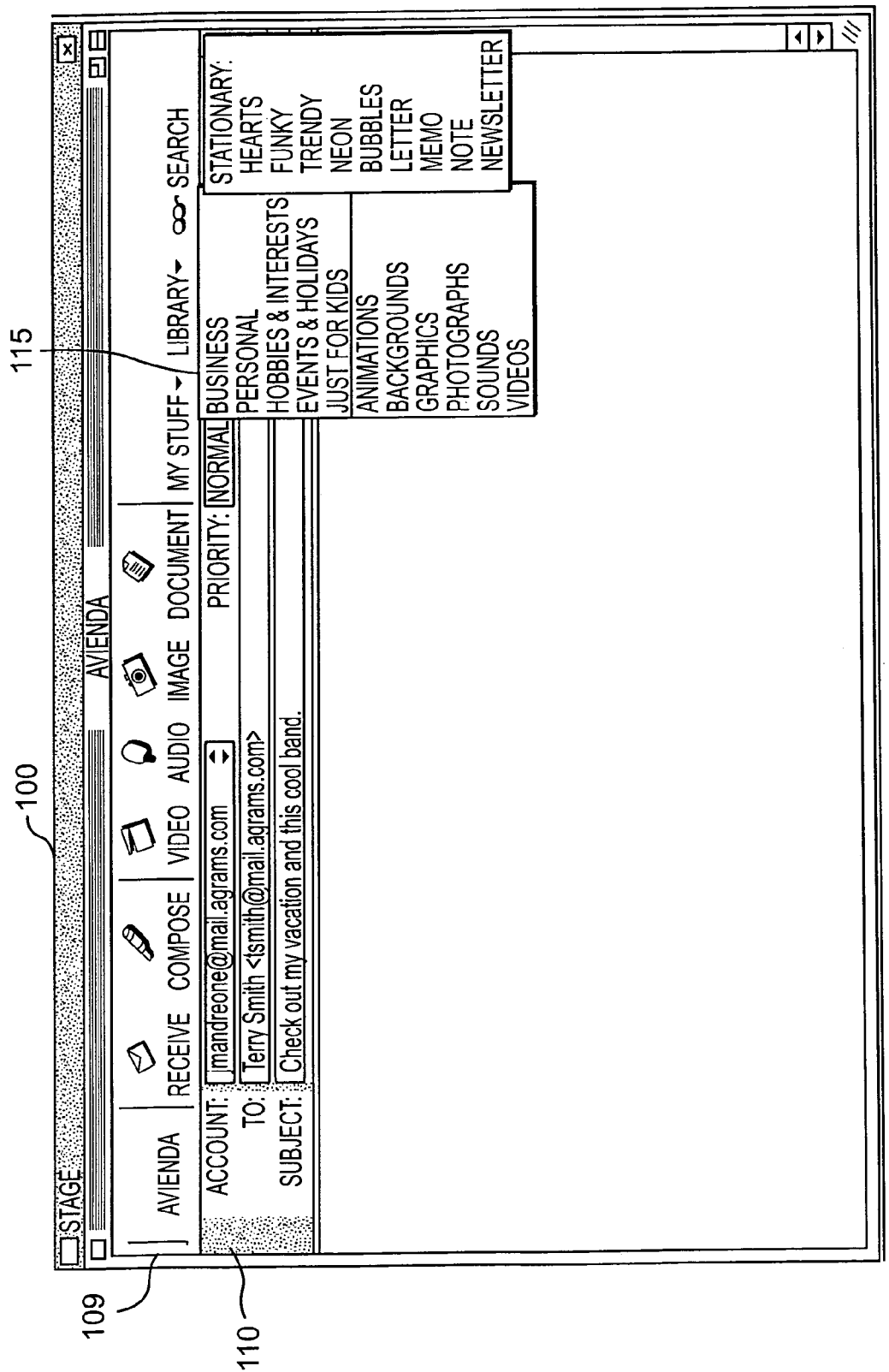
Figure 1C:
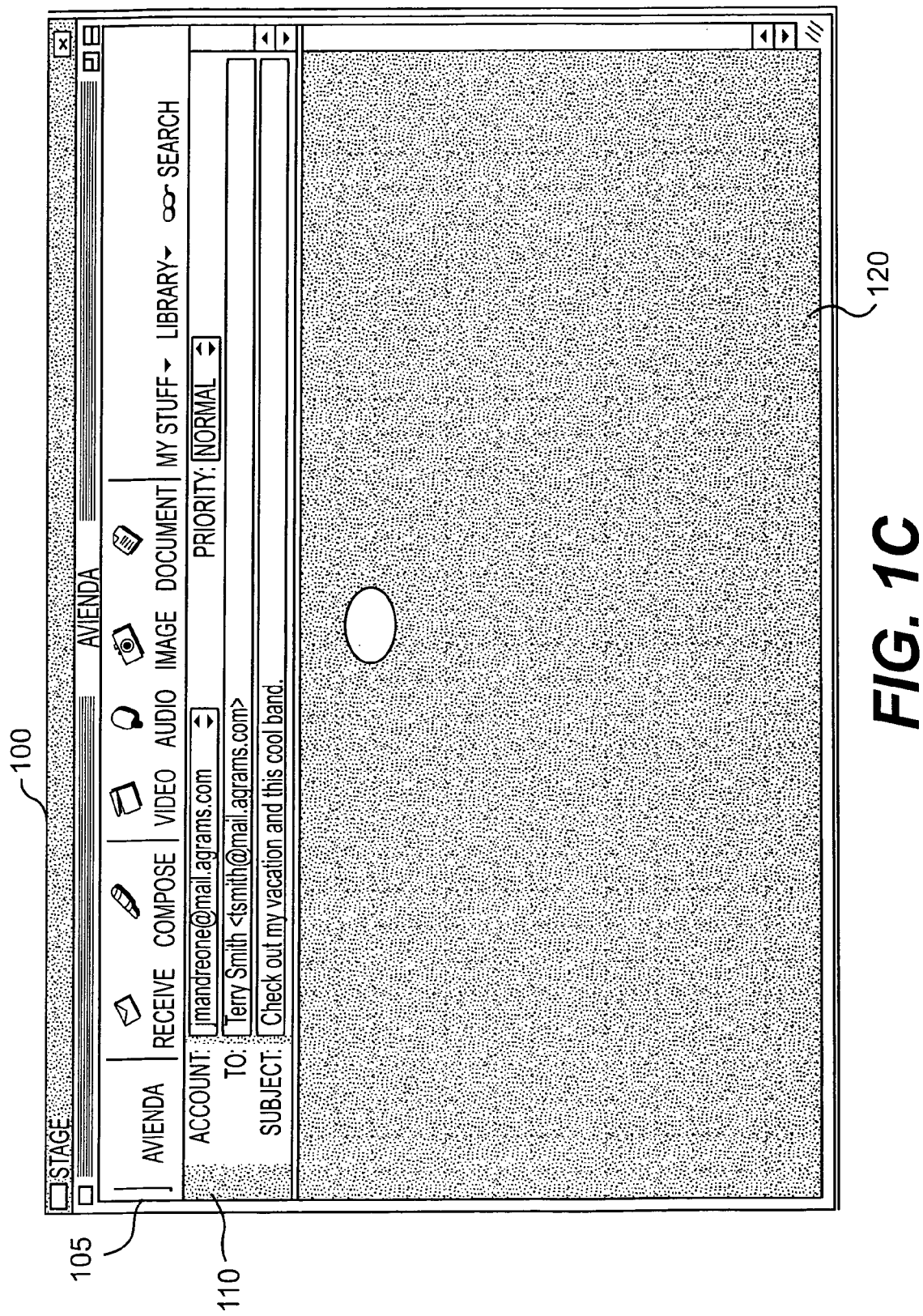

When a user composes an email message, the user selects one of the drop down menus 115 available on menu bar 105 as illustrated in FIG. 1B. For example, a library menu icon on menu bar 105 can be selected to display a series of template choices. The user is able to select one of the templates, such as the "Bubbles" template. Essentially, the template is a set of pre-existing content for use in the email message. As illustrated in FIG. 1C, selecting the "Bubbles" template causes a background graphic image along with pre-selected or boilerplate basic content 120 (such as an animation of bubbles moving across the monitor) to appear within window 100.

Figure 1D:
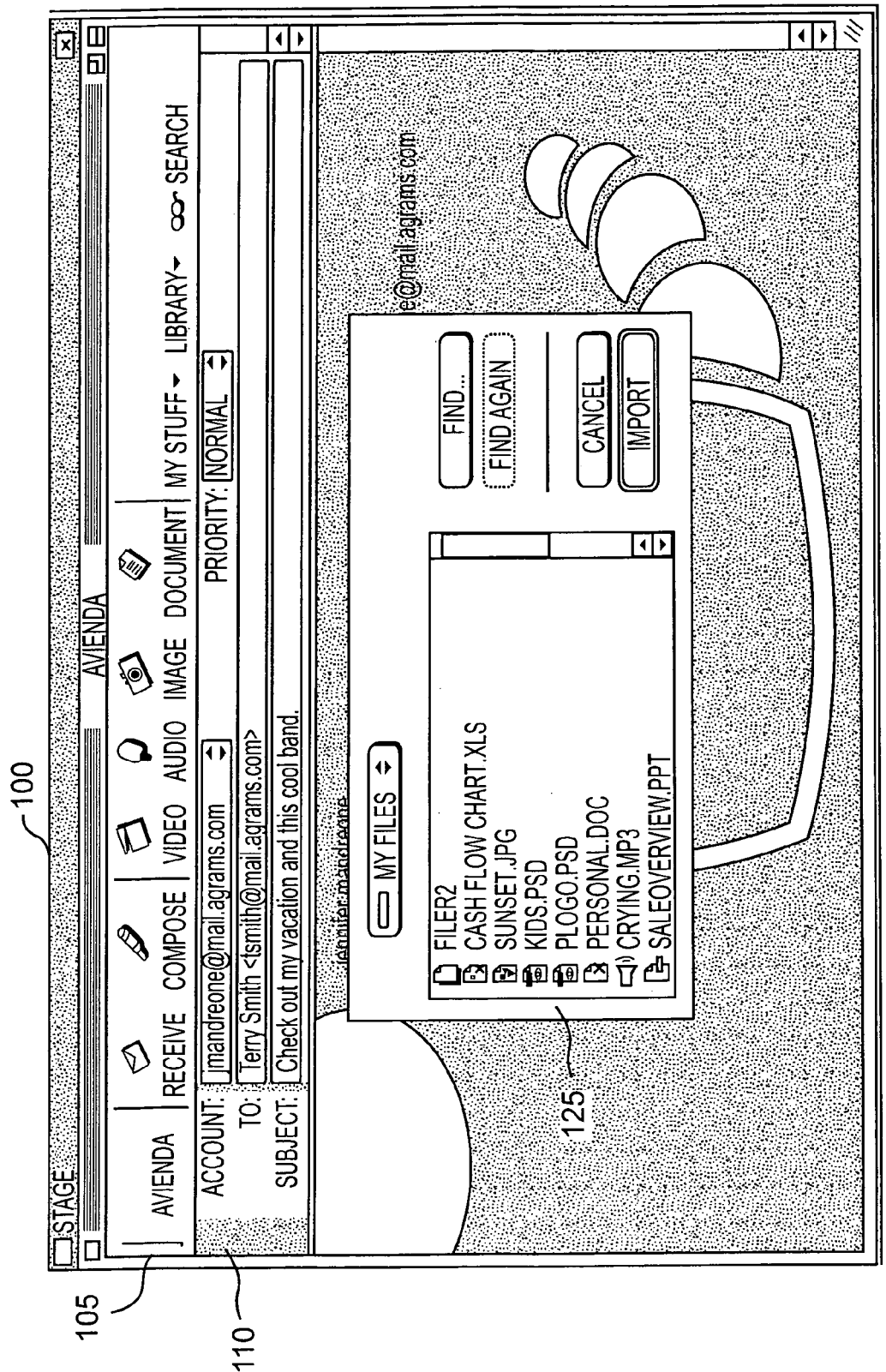

After setting up the background and basic content for the message, the user is able to further customize the email message as illustrated in FIG. 1D. Referring now to FIG. 1D, the user causes a selection banner 125 to be displayed in order to select additional content for the email message. In example, this additional content may include an audio file formatted in a conventional .MP3 format, a video file formatted in a conventional .JPG format, or other multimedia content available on the storage device named "my files."

Figure 1E:
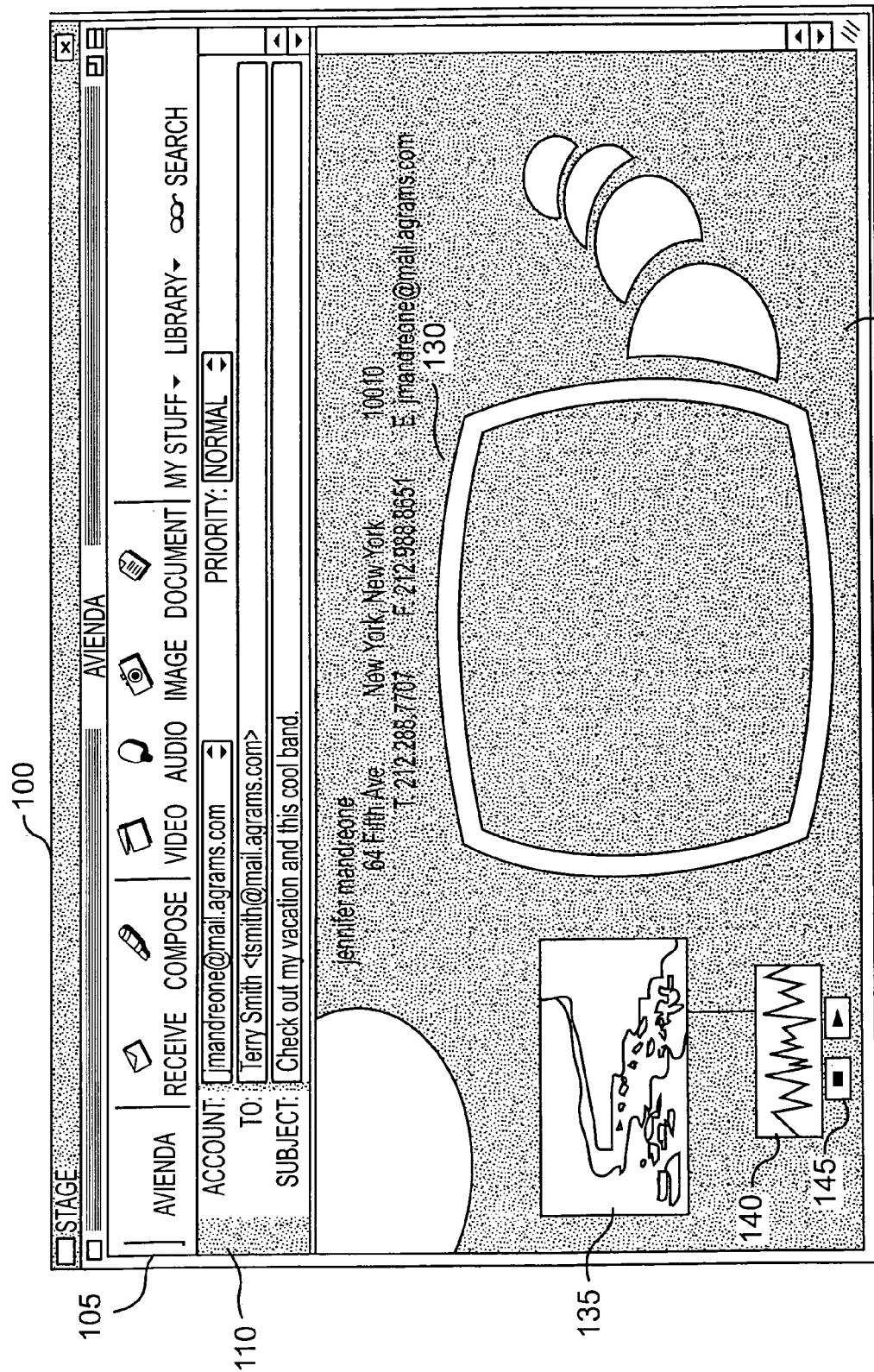

Once the additional content is selected, it appears on the basic background 120 within window 100 as shown in FIG. 1E. For example, a graphic representation 130 of the sender's name, address and telephone number appear at a designated part in the body of the mail message. A series of still images 135 has also been selected. The images 135 appear at another location within the body of the message. Further, a sound file was selected to provide some background music when the intended recipient opens and views the email message. The sound file and controls for playing such content also appear within the body of the message as audio indicator 140 and audio controls 145.

What is not readily apparent to the user is that as this content appears to be added to the body of the message, the content is actually provided to a server computer. In an exemplary embodiment of the present invention, the content is formatted according to a streaming protocol and then sent to the server computer for storage until the intended recipient opens the email message. While the content is on the server, it can be updated or changed even before the recipient opens the message. Streaming the content to such a server cleverly minimizes the amount of information actually transmitted up front to the intended recipient while allowing the sender to create with an almost endless palette of multimedia content for the message to be later streamed to the recipient. In this manner, the delivery of the content is advantageously altered to take advantage of a global network of content servers and the intelligence they provide when delivering such content.

Figure 1F:
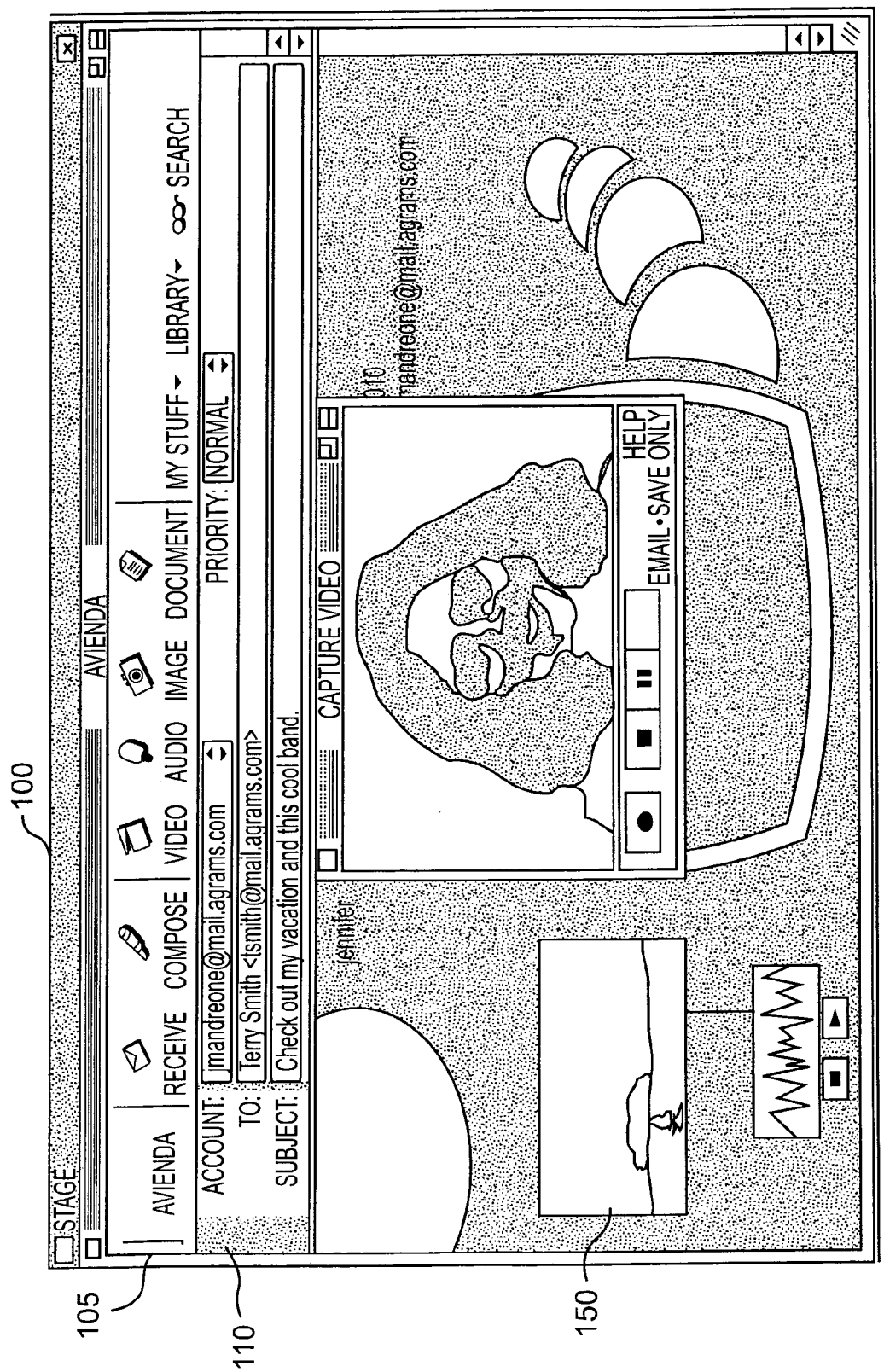

The front-end client application not only operates as a composition tool, but is also able to control peripheral devices capable of capturing multimedia content. For example, the computer running the front-end client application illustrated in FIG. 1F is capable of controlling a video capturing device, such as a digital camera, video camera, a image scanner, or any other kind of device that digitizes or otherwise captures multimedia content. As shown in FIG. 1F, the front-end client application displays captured video content and controls for the video capturing device in a video capture panel 150. Using this panel 150, the user is able to look through potential video footage to find the desired video content for the email message.

Figure 1G:
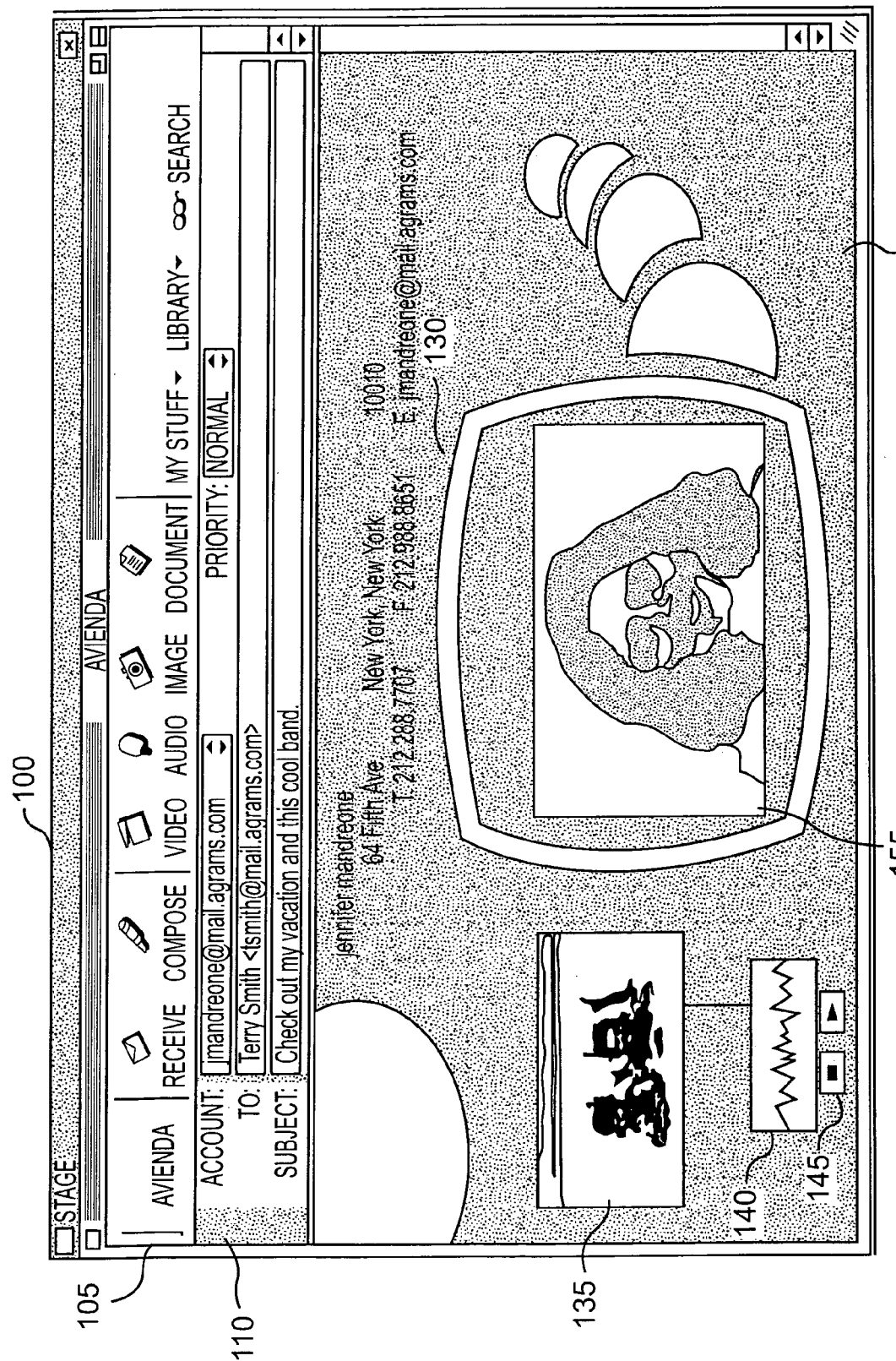

Once the desired video content is selected, the video content appears in a designated location 155 within the body of the email message as illustrated in FIG. 1G. Predefined templates may be used by the sender to compose an email message having pre-designated locations for different types of content (e.g., video, images, graphics, audio, animation, text, etc.). However, the sender can move those locations using conventional drag and drop techniques known to those skilled in the art or may start "from scratch" without a template with pre-designated locations.

After the video content appears in the body of the email message, the video content is also provided (e.g., formatted into a streamed format and transmitted as a substantially continuous stream of data according to a streaming protocol) to the server for storage. Within the server's memory storage, the video content joins the other stored content from the composed email message. Thus, the sender uses the front-end client application to compose the email message and streams its content to a server prior to transmitting the email message.

Figure 2:
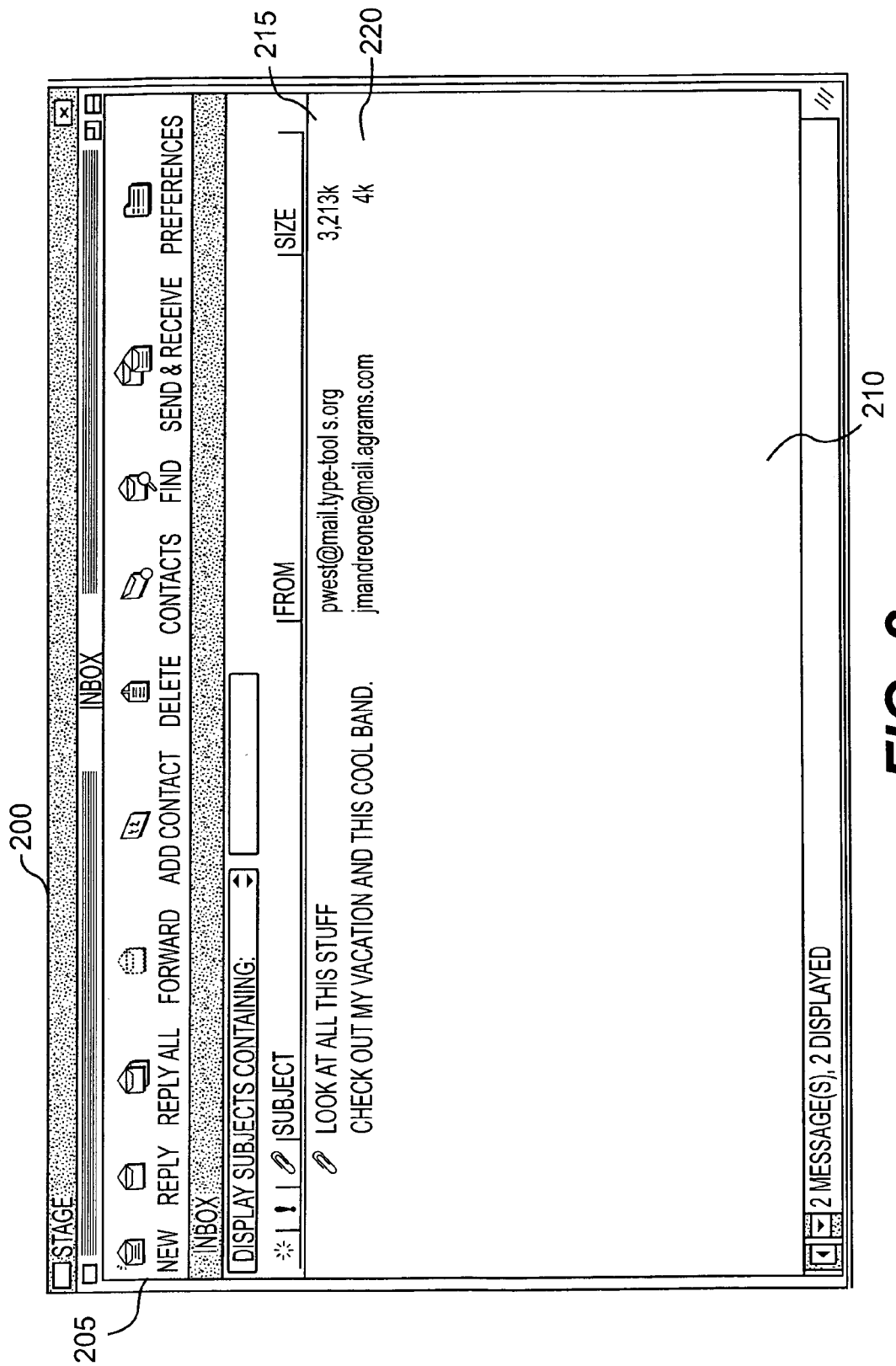
FIG. 2 is a computer screen shot illustration showing the contents of an inbox for an email client application consistent with an embodiment of the present invention.

As previously mentioned, conventional email is delivered in bulk to an email client application and commonly requires file attachments for its multimedia content. FIG. 2 is a computer screen shot illustration showing the contents of an inbox for an email client application consistent with an embodiment of the present invention. Referring now to FIG. 2, inbox window 200 displayed by the email client application has a menu bar 205 that is used to select and view email messages, such as messages 215, 220. One of the messages 215 present within message area 210 is a conventional email message having its multimedia content sent within bulky file attachments. In the example illustrated in FIG. 2, this conventional message 215 has a memory footprint of approximately 3.2 Mbytes. In contrast, the second message 220 in message area 210 is an email message composed and transmitted in accordance with an embodiment of the present invention and does not have such bulky file attachments. As a result, this second message 220 has a relatively small memory footprint. In the example illustrated in FIG. 2, this second message 220 has a memory footprint of approximately 4 Kbytes. Thus, the second message 220 created and transmitted in accordance with an embodiment of the present invention is easily and quickly delivered through existing mail servers on the Internet computer network.

Figure 3A:
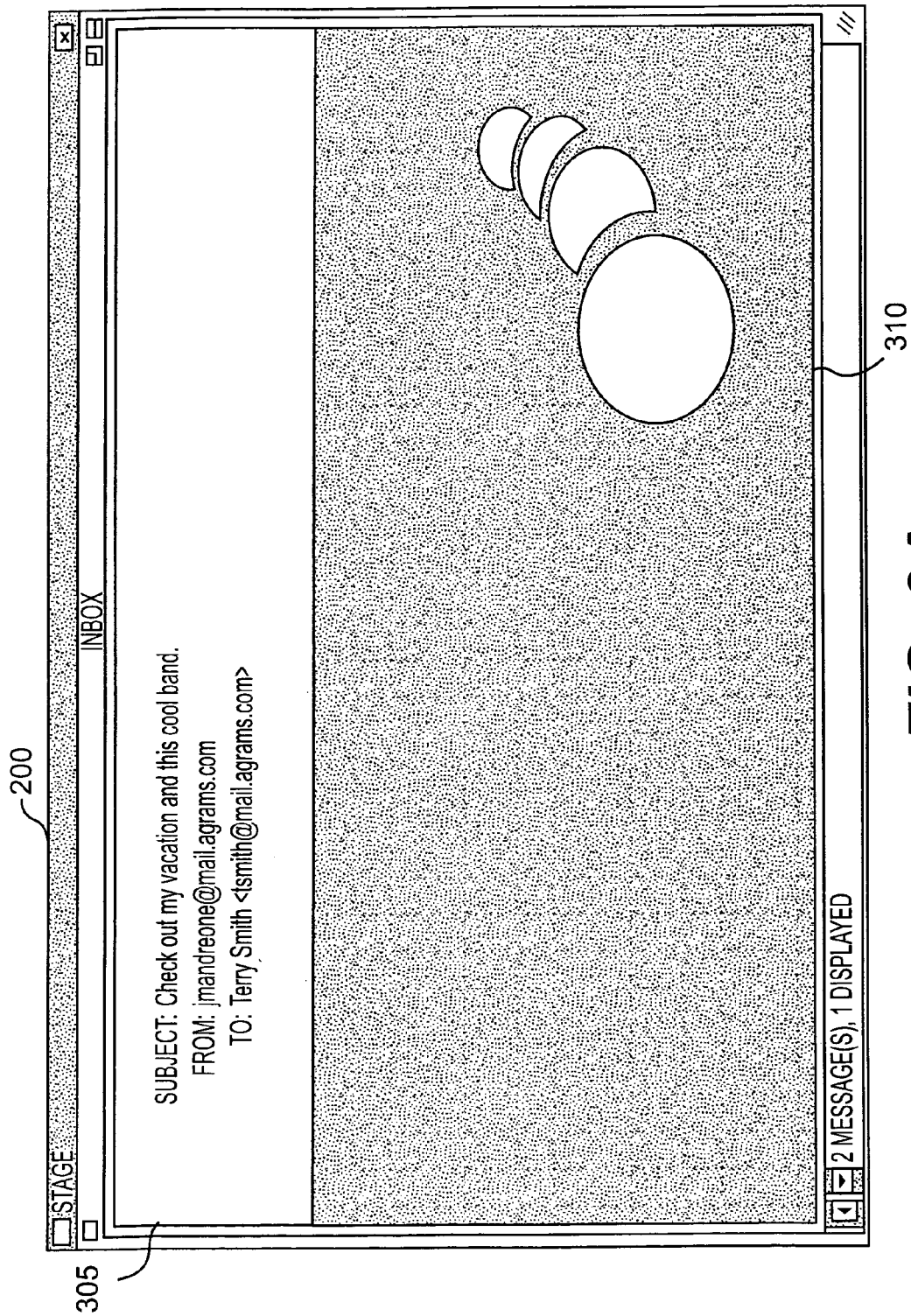
FIG. 3, consisting of FIGS. 3A–3E, are computer screen shot illustrations showing how an email client application is used to view a dynamic content-rich email message consistent with an embodiment of the present invention.

When the intended recipient selects the second message 220, the email message is displayed on the computer screen. FIG. 3, consisting of FIGS. 3A–3E, are computer screen shot illustrations showing how the email client application displays dynamic content-rich email message consistent with an embodiment of the present invention. Referring now to FIG. 3A, the email client application displays an email header 305 and a body portion 310 of the email message in response to selecting the second message 220. The email client application interprets the minimal amount of information actually contained within the second message 220 to display some basic content (such as the "bubbles" animation content shown in the body 310 of the email message) while the application also accesses the referenced content by sending a request to the server maintaining the content.

Figure 3B:
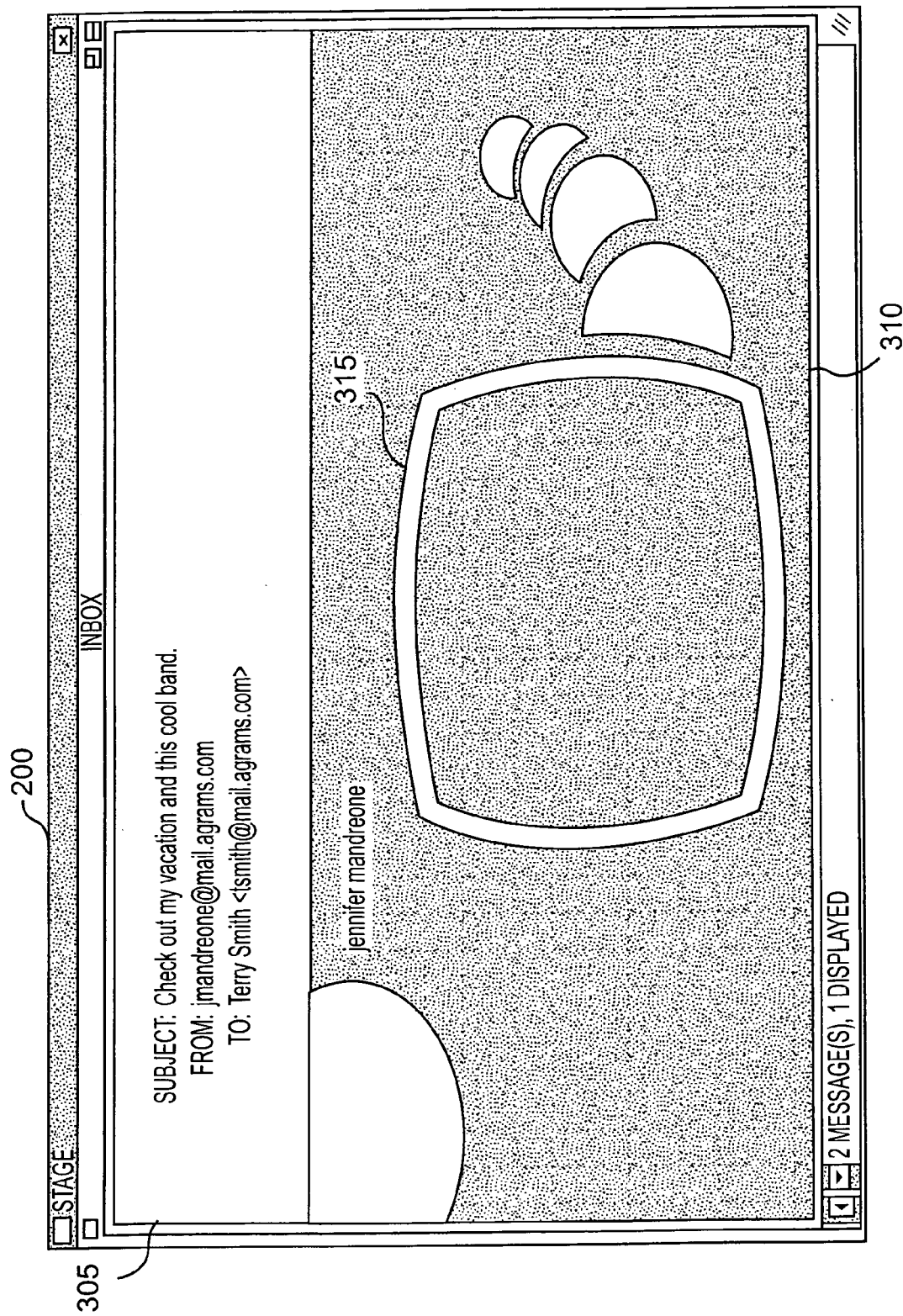

Referring now to FIG. 3B, as the basic content (such as text and graphics 315 that identifies the sender) continues to be displayed to the intended recipient, the content for the email message is accessed from the server. The server transfers the content from the appropriate memory storage (such as an optimized location within the network) to the requesting email client application. Thus, the recipient is unaware of any transition from the basic content sent along with the email message to the streamed content from the server that appears as content 320 within the body of the email message. As will be discussed in more detail below, it is advantageous to optimize the amount of basic content sent along with the actual email message to avoid latency problems and delays when viewing the email message by the intended recipient.

Figure 3C:
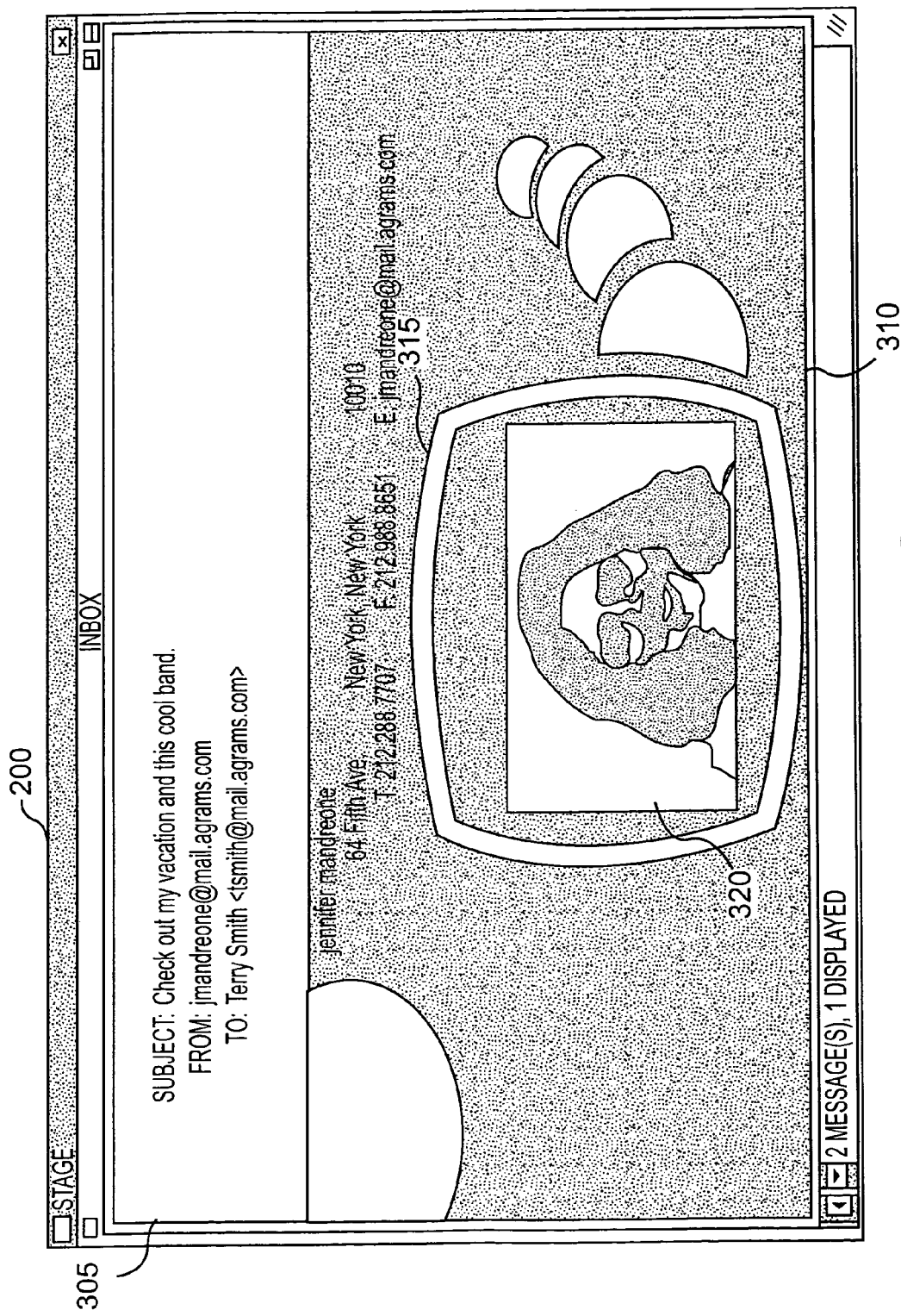
Figure 3D:
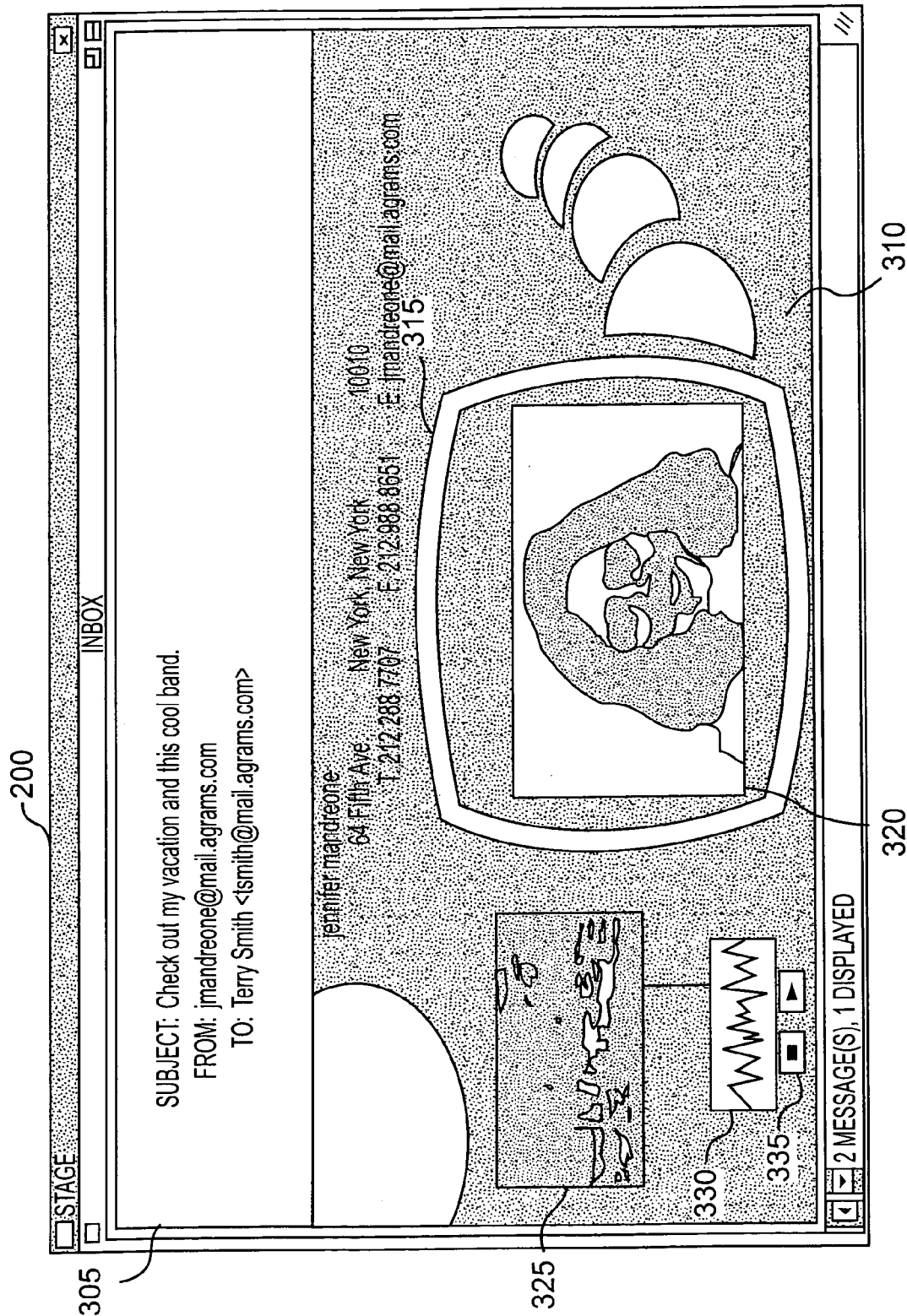
Figure 3E:
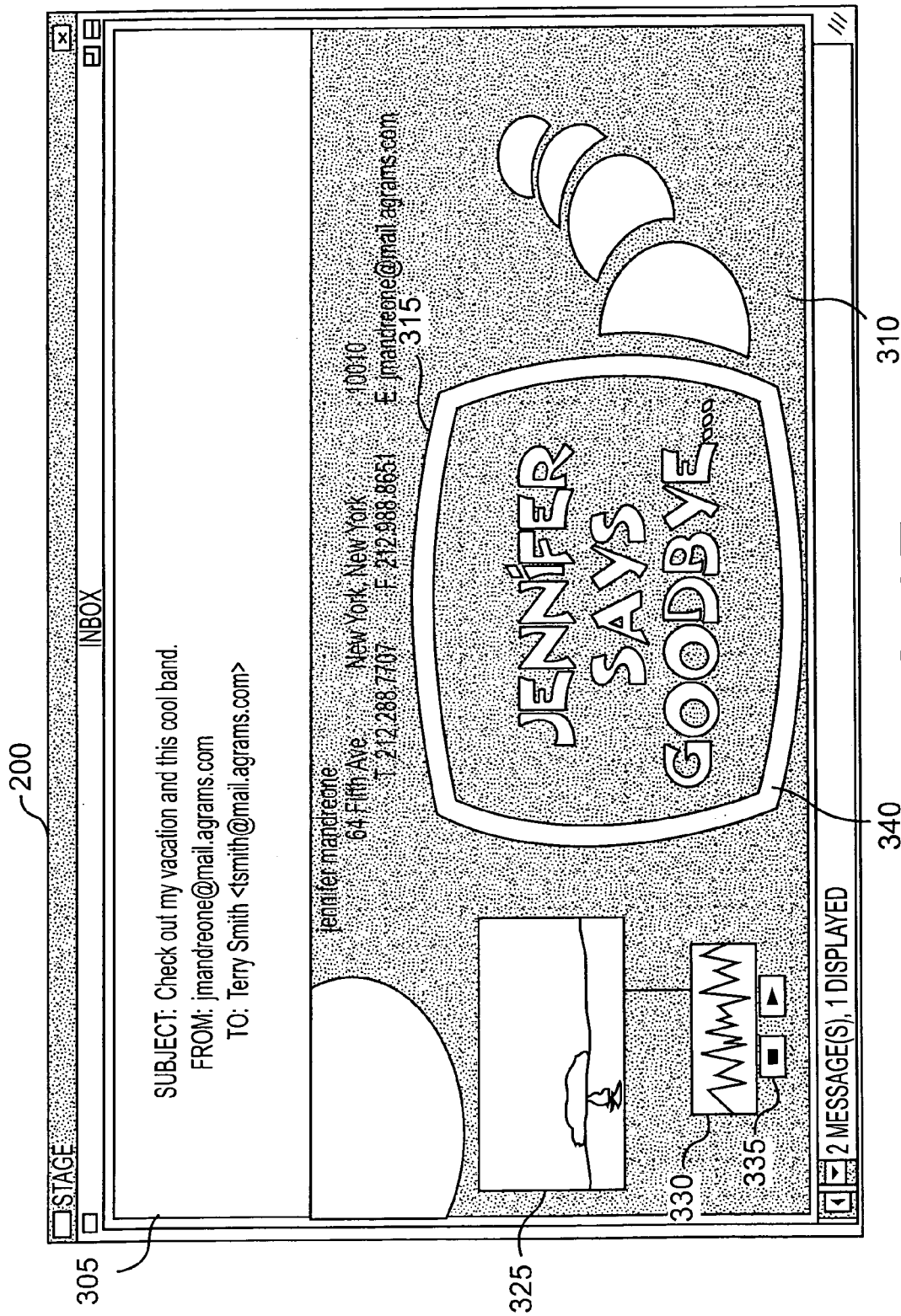

As the content is received, processed and shown to the intended recipient, other content elements begin to appear within the body of the email message. In the example illustrated in FIG. 3D, video content 320 is displayed providing a narrative for the message to the intended recipient while the series of images 325 appear in a user-defined sequence and background music 330 is played. If the recipient decides to turn off the music, the recipient need only select one of the displayed interactive controls 335 embedded within the content-rich body of the email message. In FIG. 3E, a graphic message 340 appears where the video content was previously provided to conclude the email message as a picture of the sunset appears as an image 325 and the music fades. In summary, each of FIGS. 1–3 show how content-rich messages having a small memory footprint can be created, sent, and viewed while still using a virtually limitless amount of content and while avoiding the problems associated with sending such content as file attachments.

The content illustrated within the body of the email message can be dynamic in that it may change after the email is created but before the intended recipient views the content. For example, a sender may create an email with certain images but later desire to update those images to give the intended recipient the most up to date content possible. Additionally, the content may be considered dynamic in the sense of where within the network it is positioned or re-positioned as will be discussed in more detail below. Thus, dynamic content is made available within the body of an email message for an increasingly robust and media-rich communication experience.

Distributed Network Architecture

Figure 4:
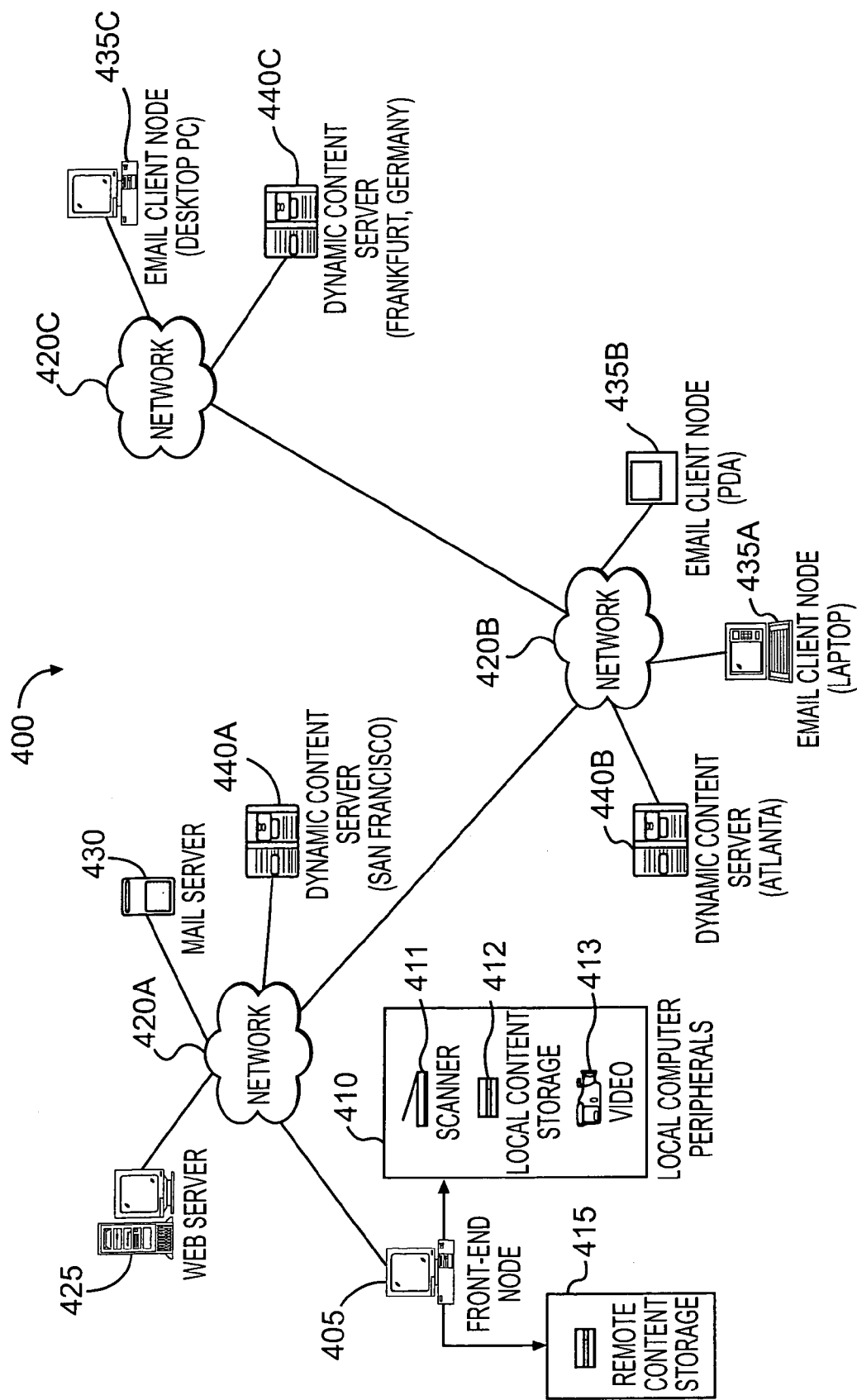
FIG. 4 is a block diagram of an exemplary networked system suitable for use with methods and systems consistent with an embodiment of the present invention.

In the context of the above discussion on a user's perspective of how various embodiments of the present invention operates, an embodiment of the present invention is further described below within a distributed network of interconnected nodes. Basically, FIG. 4 depicts an exemplary distributed network 400 suitable for practicing methods and implementing systems consistent with the present invention. This network 400 is distributed in that it has processing, storage, and other functions which are handled by separate computing units (nodes) rather than by a single main computer. Furthermore, those skilled in the art will realize that such a network 400 may be implemented in a variety of forms (computing elements on a simple bus structure, a local area network (LAN), a wide area network (WAN), the global Internet, a broadband network with set-top communication devices, a wireless network of mobile communicating devices, etc.) that provides an intercommunication medium between its nodes.

Referring now to FIG. 4, exemplary network 400 is labeled as separate network segments (referred to as subnetworks 420A, 420B, and 420C). While each of these subnetworks are interconnected and are actually part of network 400, it is merely convenient to label them separately into subnetworks to emphasize the different geographic locations of parts of network 400. Those skilled in the art will realize that each of these subnetworks can also be considered a network by itself and may also interconnect other nodes (not shown) or other networks (not shown). In the exemplary embodiment of FIG. 4, subnetwork 420A interconnects a front-end node 405, a conventional web server 425, a conventional mail server 430, a dynamic content server 440A, each of which are physically located in the San Francisco, Calif. area. Other parts of network 400 include subnetwork 420B located in the Atlanta area (interconnecting another dynamic content server 440B and two email client nodes 435A and 435B to network 400) and subnetwork 420C located in the Frankfurt, Germany area. Subnetwork 420C interconnects yet another dynamic content server 440C and another email client node 435C to network 400.

Front-end node 405 is generally considered to be a network node having a processor, memory in which to run programs and create messages and a communications interface to connect to network 420A. In the exemplary embodiment, front-end node 405 is a conventional personal computer (such as an IBM-compatible computer or Apple MACINTOSH computer) with memory including a main memory of random access memory (RAM) and a local hard disk drive (not shown). Front-end node 405 further includes a conventional Ethernet network interface card for connecting to network 400 via a gateway (not shown) from a LAN (not shown) that is part of subnetwork 420A. Front-end node 405 may alternatively use a conventional modem (not shown) to connect to network 400 via a WAN (not shown) that is part of subnetwork 420A.

Those skilled in the art will appreciate that there are a many different types of communication devices that may communicate on a network as a front-end node. For example, a front-end node may be alternatively implemented as a mobile communications device having a microcontroller that accesses a small amount of RAM. The device would further include a radio transceiver with an antenna functioning as a communications interface that connects the device to a wireless network.

In the exemplary embodiment illustrated in FIG. 4, front-end node 405 can be used to view web pages by sending an appropriately formatted request to web server 425. Front-end node 405 can also send conventional email by sending an appropriately formatted message from front-end node 405 to mail server 430, which will eventually route the message to its intended destination (such as an email client node on the network 400) when requested to do so.

According to an embodiment of the present invention, a user can create a content-rich email message (similar to that illustrated above regarding FIGS. 1–3) using front-end node 405. In order to facilitate gathering and accessing content for use when creating an email message, front-end node 405 is coupled to a variety of local computer peripherals 410 and remote content storage 415. The coupling may be accomplished via a simple bus connection to the peripheral, a network connection to the peripherals or through a separate interface, such as an USB connection, IEEE-488 bus connection or an RS-232 connection. The precise connection used with the local computer peripherals 410 will depend on the exact type of peripheral used.

The local computer peripherals 410 typically include a scanner 411, a local content storage device 412 and a video capture device 413. Local content storage device 412 and remote content storage 415 typically maintain multimedia content such as images, electronic presentations, word processing documents, pre-defined templates and other content useful for making a content-rich email message.

Similar to front-end node 405, each email client node 435A–C is generally a network node (also called an access point) for receiving messages. Each email client node 435A–C has a processor, memory in which to run programs and a communications interface (similar to that previously described) to connect to network 400. In the exemplary embodiment illustrated in FIG. 4, email client node 435A is a conventional personal computer (IBM-compatible) with a main memory of RAM (not shown), a local hard disk drive (not shown) and an Ethernet network interface card (not shown) for connecting to network 400 via subnetwork 420B. Alternatively, email client node 435A may use a modem (not shown) to connect to network 400. In the exemplary embodiment, email client node 435B is a network node implemented in a personal digital assistant (PDA) form factor while email client node 435C is a network node implemented in a desktop personal computer form factor. Those skilled in the art will appreciate that any communication device (e.g., computer, PDA, mobile radio, cellular phone, set-top receiver, etc.) that can receive and display messages may be an email client node. Furthermore, those skilled in the art will understand and recognize that any given node on network 400 may have the functionality of both a front-end node and an email client node. Thus, a variety of implementations are possible for an email client node.

Looking at dynamic content servers 440A–440C, each is essentially a back-end server that manages dynamic content referenced to be part of email messages. A dynamic content server stores and maintains a database of user created content (such as personal video, digital camera images, personal sound recording) along with a library of existing or commercial content (commercial video clips, commercial sound studio files, etc.) for use when composing a content-rich email message on the front-end node 405.

In general terms, the dynamic content server is a node having at least one processor, memory coupled to the processor for storing content referenced by messages, and a communications interface allowing the processor to be coupled to or in communication with other nodes on network 400. It is contemplated that the dynamic content server may be implemented as a single processor, a personal computer, a minicomputer, a mainframe, a multiprocessing machine, a supercomputer, or a distributed sub-network of processing devices. In the exemplary embodiment, each of the dynamic content servers is a group of FullOn™ computers designed and distributed by VA Linux Systems of Sunnyvale, Calif. Each FullOn™ computer is a rack-mountable, dual-processor system with between 128 Mbytes and 512 Mbytes of RAM along with one or more hard drives capable of storing 8.4 Gbytes to 72.8 Gbytes of information. Each FullOn™ computer has two Pentium® III microprocessors from Intel Corporation and runs the Linux Operating System, which is considered to be result-compatible with conventional UNIX operating systems. Databases used on the dynamic content servers are typically implemented using standard MySQL databases. Furthermore, each FullOn™ computer has an integrated 10/100 Mbit/sec Ethernet network interface for placing its processors in communication with other nodes on the network. Depending upon an anticipated amount of content storage space and an anticipated transactional load for the server, the size of the group of FullOn™ computers can be adjusted and then configured to operate concurrently as a single dynamic content server. Those skilled in the art will be familiar with configuring multiple computers to operate as a single server with farms of computers functioning as firewalls, database servers, proxy servers, and process load balancers. Further information on computers from VA Linux Systems, the Linux Operating System, and MySQL databases is available from a variety of commercially available printed and online sources.

Those skilled in the art will quickly recognize that a dynamic content server may be implemented in any of a variety of server and network topologies using computer hardware and software from a variety of sources. Still other embodiments consistent with the present invention may implement a dynamic content server using fault-tolerant integrated service control points within a wireless or landline advanced intelligent telecommunications network (AIN). Additionally, one skilled in the art will appreciate that while a dynamic content server may be implemented as a separate server node, it may also be incorporated into other network nodes, such as web server 425 or mail server 430. In the later situation, mail server node 430 would simply be programmed with the functionality described below associated with the back-end dynamic content servers 440.

Referring back to FIG. 4, as a content-rich email message is created on front-end client node 405, the content is stored on one of the dynamic content servers 440A–C. The intended recipient uses one of the email client nodes 435A–C to access their email. When the intended recipient begins to view the content-rich email message (as illustrated in FIG. 3), the email client node used by the recipient requests the content from one of the dynamic content servers.

As described below (and in more detail with regard to FIGS. 5 and 6), the content can be cleverly pre-positioned within the network 400. Typically, the content is initially stored close to an anticipated access point for the communication (i.e., the node from which the communication will likely be viewed and from which the content will likely be requested). With the ability to initially position the content and then change that position within the network (if needed), the content is intelligently managed by the dynamic content servers and kept optimally close to where the recipient will likely request it. In this manner, the dynamic content servers advantageously help to reduce latency and improve performance from the intended recipient's perspective.

Referring back to the email message example, if it is anticipated that the intended recipient will access new email messages using email client node 435A based upon prior email access activities, then the content should be maintained on the dynamic content server that is physically closer to that node (i.e., dynamic content server 440B). How the determination is made regarding which of the dynamic content servers is closest to the anticipated access point is generally based on factors related to the recipient (such as the recipient's message accessing profile and the recipient's domain name address) and factors related to sender (such as a history of where the sender sends email messages or a language characteristic associated with the message). Additionally, if the content changes or if any of these factors change, the content may be subsequently moved to an updated or more optimal location within the network (i.e., the location of another dynamic content server in the network based on an updated estimation of the access point for the message).

Simplified Network Diagram

Figure 5:
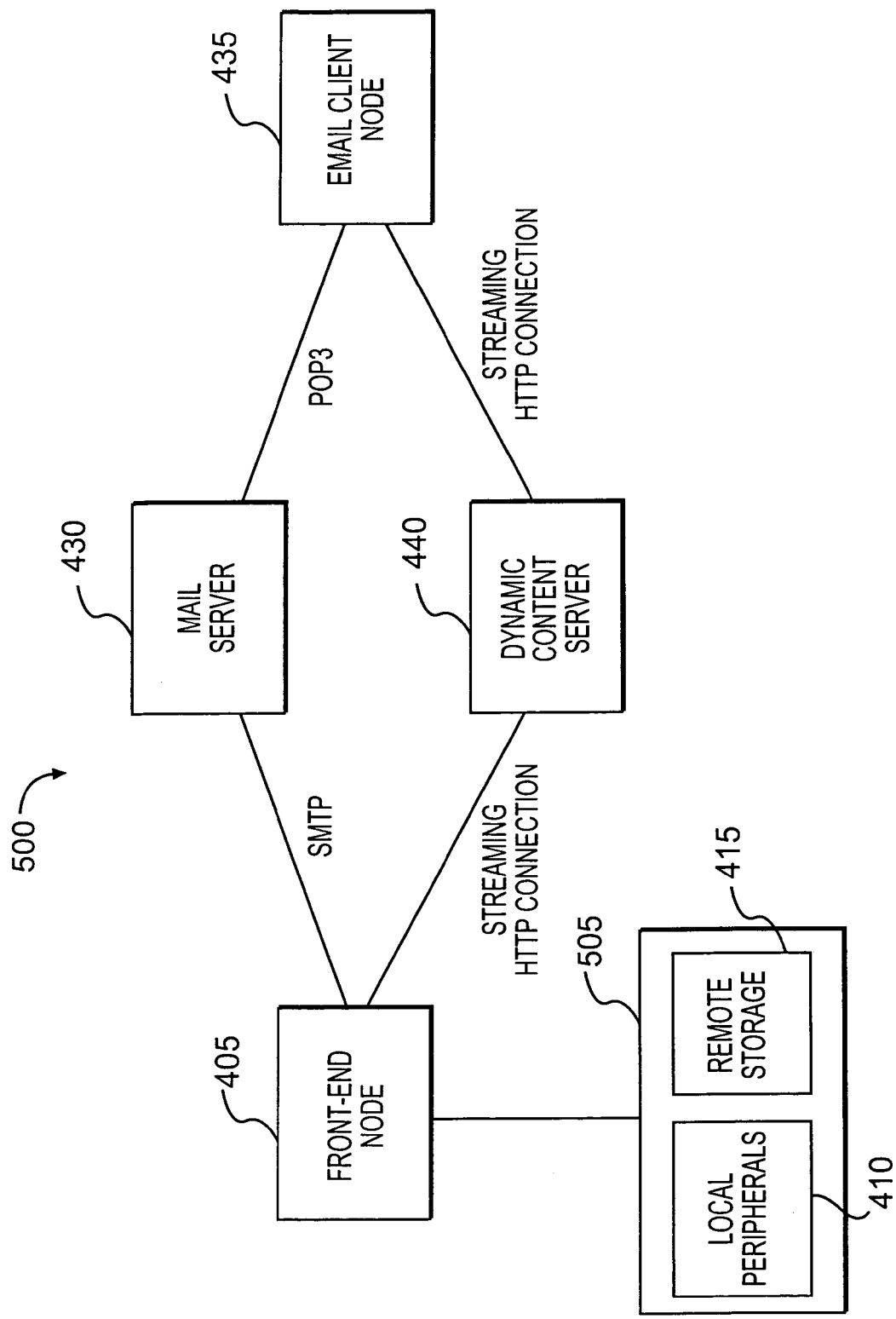
FIG. 5 is a simplified block diagram of an exemplary networked system of nodes and servers suitable for use with methods and systems consistent with an embodiment of the present invention.

FIG. 5 simplifies the FIG. 4 block diagram an exemplary networked system of nodes, servers, and their intercommunication connections suitable for use with methods and systems consistent with an embodiment of the present invention. Referring now to networked system 500 in FIG. 5, front-end node 405 is shown connected to mail server 430, which is further connected to email client node 435. In the prior art, conventional email is composed using a mail application module on front-end node 405 for delivery to mail server 430 via an SMTP formatted message. Once delivered to mail server 430, email client node 435 can retrieve such conventional email via a POP3 formatted message or an IMAP formatted message. A recipient views such conventional email on email client node 435 only after a full email transmission (i.e., the header, body of the message, and all file attachments) has been completed. As a result, such a prior art system can only deliver a limited amount of content without long download times and high levels of user dissatisfaction.

To enable robust and content-rich communications without such problems, an embodiment of the present invention takes advantage of one or more dynamic content servers 440

(also referred to as the GLOBAL MESSAGING NETWORK™ Platform from Avienda Technologies) when composing, delivering, receiving and viewing content-rich communications such as email messages. Referring back to FIG. 5, front-end node 405 accesses a source for content 505, including controllable peripherals 410 and remote storage 415, gathers content and creates a content-rich message. Using the email message example, a minimal part of the email message is sent to mail server 430 for ultimate delivery to email client node 435. The minimal part (also known as a minimal data set) typically includes a set of hypertext markup language (HTML) instructions defining the layout for the message and referencing the content for designated locations in the layout. Additionally, the minimal part usually includes a relatively small amount of basic content that is initially viewed by the recipient when the message is opened and viewed.

In general, the content associated with the message is streamed to dynamic content server 440 via a conventional hypertext transfer protocol (HTTP) network connection. When the message is opened, the content referenced by the instruction set is requested by the email client node 435 and provided by the dynamic content server 440 using a streaming HTTP network connection to the email client node 435.

Client/Server and Software Module Interaction

Figure 6:
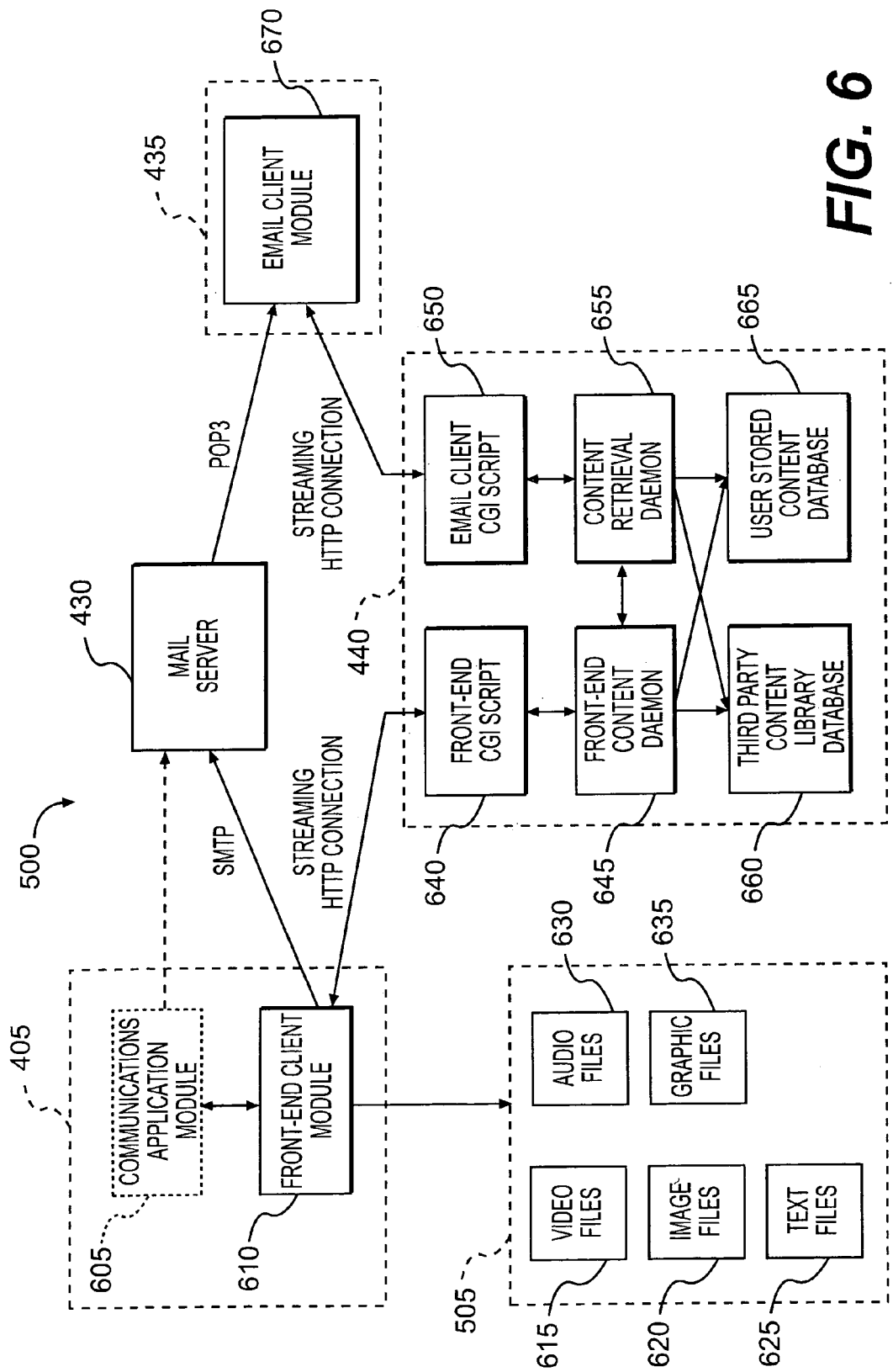
FIG. 6 is a detailed diagram illustrating client/server interactions between modules on a front-end node, a dynamic content server and an email client node consistent with an embodiment of the present invention.

Looking at the enhanced email message example in more detail, FIG. 6 illustrates the client/server interactions between front-end node 405, one of the dynamic content servers 440 and one of the email client node 435 consistent with an embodiment of the present invention. Referring now to FIG. 6, the front-end node 405, dynamic content server 440 and the email client server 435 are each illustrated as containing software modules that interact with each other. Those skilled in the art will realize that such software modules operate within memory of the particular network nodes and, as mentioned previously, provide functionality when used in conjunction with one or more processors (e.g., discrete electronic components, microcontrollers, microprocessors, optical processors, bio-processors, or any other kind of device that is able to process representations of information) and the interfacing hardware and software enabling intercommunication between the nodes.

A front-end client application or module 610 is shown within memory of the front-end node 405. Front-end client module 610 is responsible for creating and transmitting content-rich communications and is preferably referred to as the POWER MESSAGING™ Platform from Avienda Technologies. In one embodiment, front-end client module 610 is implemented as a standalone software tool used to create a content-rich communication (such as an email message) that is delivered without file attachments, without the use of separate plug-in software, and without incurring lengthy downloads.

In another embodiment, front-end client module 610 is implemented as a web-based communication application that allows users to access front-end client node 405 as a website hosting server. In such an implementation, front-end client module 610 operates as a web-based mail application (similar to web-based email products from Hotmail.com) with the enhanced capability to create content-rich messages that are delivered without file attachments, without the use of separate plug-in software, and without incurring lengthy downloads as described below.

In yet another embodiment, front-end client module 610 is implemented as an extension to an existing communications application program 605 (e.g., communication programs such as the Microsoft Outlook™ electronic mail application or the web-based mail application from Hotmail.com) to enable enhanced functionality with the existing application program 605. In such an embodiment, front-end client module 610 is responsible for controlling various computer peripherals used to capture content, streaming the content to a dynamic content server and sending the rest of the email message to the mail server. Furthermore, front-end client module 610 uses software interfacing mechanisms in order to share information between it and the application module 605. In this way, existing communications application module 605 integrates select functionality of front-end client module 610 (such as its ability to control peripherals and capture content) and uses front-end client module 610 to determine what parts of the message are sent conventionally and what parts are more advantageously streamed to a dynamic content server.

In the exemplary embodiment, the software interfacing mechanisms implementing such integration of program modules are conventional object linking and embedding (OLE), ActiveX controls and other common object model (COM) technology made available by Microsoft Corporation. In general, COM technology is used to allow disparate technologies to interact and communicate information. More specifically, COM technology defines a binary standard that enables two applications to communicate through object-oriented interfaces without requiring either of the applications to know anything about the other's implementation.

Looking at the alternative embodiment in more detail, front-end client module 610 interacts with OLE objects and ActiveX controls available within the existing application module 605. When the application module 605 is executed, it initializes its ActiveX controls. As part of this initialization, front-end client module 610 is essentially able to instruct the ActiveX control responsible for the toolbar to include a button that allows the user to send a message as an enhanced email message using the front-end client module 610.

When the user clicks the button, front-end client module 610 interacts with the appropriate OLE objects and ActiveX controls that are built into application module 605. For example, front-end client module 610 may interact with an object within application module 605 to get the "TO:" fields, "FROM:" fields, and "SUBJECT:" fields. Front-end client module 610 would then interact with the appropriate object to receive the contents of the message from application module 605 along with any file attachments normally transmitted with the email message. Once front-end client module 610 receives this information, front-end client module 610 is able use this information to generate a minimal amount of information to actually send as the message and stream the remaining content to dynamic content server 440.

Those skilled in the art will appreciate that principles of the present invention apply to other implementations where the functionality of front-end client module 610 and existing application module 605 are integrated. Additionally, those skilled in the art will be familiar with OLE, ActiveX controls and COM technology useful for integrating two application program modules, such as front-end client module 610 and application module 605. Numerous references on these topics are available from commercial publishers, such as "*ActiveX Controls Inside Out*" by Adam Denning and published by Microsoft Press.

Referring back to the exemplary embodiment, front-end client module 610 controls computer peripherals (such as local computer peripherals 410) to capture and access content for placement within the message. Such captured and accessed content includes video files 615, image files 620, audio files 630 and graphics files 635 (including static and animated graphics). These files may be captured through media input devices or may be already stored in local content storage device 412 and remote content storage 415.

Front-end client module 610 further allows a user to import and convert standard text files 625 containing word processing documents, electronic presentations or spreadsheets. For example, the text files 625 may include Microsoft Word formatted document files, Microsoft PowerPoint formatted presentation files, or Microsoft Excel formatted spreadsheet files having text and graphic information within the respective files that may be useful as content for an email message. Front-end client module 610 typically converts these files into a format (such as a conventional HTML format) that can be easily referenced within the instruction set sent along with the email message.

In the exemplary embodiment, front-end client module 610 causes this conversion to occur by sending the text file 625 to dynamic content server, which preferably performs the conversion process. This advantageously allows the dynamic content server to shoulder the conversion workload while freeing up the front-end client module 610 to do other tasks. However, it is contemplated that these conversion tasks could be done by front-end client node 405 or any other node on network 400.

Front-end client module 610 can also use or import content for use within the body of the email message by accessing a library database 660 within one of the dynamic servers 440 on the network. Third parties can provide such media libraries for use by others. Examples of such third party content library database 660 would include templates (e.g., personal message template, corporate memo template, etc.), graphics libraries, video databases from a television company or a library of sound files licensed from a sound studio. In the exemplary embodiment, front-end client module 610 accesses a selected part of such a library database 660 by making an HTTP connection to dynamic content server 440. Front-end common gateway interface (CGI) script 640 serves the connection request for content by communicating with front-end content daemon 645 within dynamic content server 440. Essentially, front-end content daemon 645 manages the content within dynamic content server 440. Those skilled in the art will be familiar with using a CGI script as a conventional software mechanism for handling server requests from the network. Those skilled in the art will further appreciate that daemons are background processes custom written to perform specific tasks and are commonly used within UNIX-based operating environments. Thus, third party content library databases 660 can be used to increase the potential multimedia content palette for the email composer.

Front-end client module 610 typically includes tools used to manipulate the content elements as they are accessed and placed in a desired layout. In one embodiment, the layout is predefined with designated locations for different types of content (e.g., images, sound, video, textual information on who is sending the message, etc.). However, in other embodiments, the layout is not predefined allowing the user to creatively place and format the content to appear in a desired manner using known drag-and-drop techniques.

Aside from accessed content elements, front-end client module 610 further allows placement of controls, such as a start button, stop button, volume level, rewind button, etc., into the body of the message. Additionally, front-end client module 610 may have its own integrated set of tools for creating content, such as drawing tools, text tools, image processing and manipulation tools, word wrapping tools, video editing tools, and animation tools. The ability of the front-end client module 610 to provided such an integrated tool that is capable of handling various types of content in differing formats with a robust tool set to edit, manipulate and create an effective content-rich message is a distinct advantage in this embodiment of the present invention.

As the content is placed into the body of the message, the content is provided to the dynamic content server 440 to be maintained until the recipient views the message. In the exemplary embodiment, streaming to dynamic content server 440 begins as soon as the content is placed. However, other embodiments of the present invention may begin streaming the content after a determination is made as to whether the message is ready to be sent and a complete set of content has been selected and placed.

In the exemplary embodiment, each content element is formatted into a stream of data according a conventional streaming protocol, preferably the Advanced Streaming Format (ASF) developed by Microsoft Corporation. Those skilled in the art will appreciate that ASF is a streaming multimedia file format but that other streaming formats may also work with the principles of the present invention. Examples of other possible streaming formats include without limitation ActiveMovie, AVI, RealAudio, RealVideo, QuickTime, Real Time Streaming Protocol (RTSP) that uses Real Time Transport Protocol (RTP) to format packets of multimedia content, and any other communication protocol that allows for data to be transferred and processed as a steady or time sensitive stream. While it is preferred to use the ASF streaming format for all content, it is further contemplated that not all content sent to and from the dynamic content server is streamed. For example, the audio and video content may be streamed according to the ASF streaming format while the images may be sent and kept in their native file format.

The formatted stream of data representing the content is sent to the dynamic content server 440 via the network for storage in a user stored content database 665. More specifically, front-end client module 610 provides the stream to front-end CGI script 640 on dynamic content server 440 where the stream is processed and routed to the appropriate storage location by front-end content daemon 645.

When the content-rich message has been composed and is complete, the user causes a daemon (not shown) within front-end client module 610 to cue the message for transmittal. This daemon analyzes the message content and determines if any content from the third party content library database 660 (also called an organizational library) or the user stored content database 665 (also called the global library) have been used. The daemon also makes sure the message has the required address(es) of the referenced content stored on the appropriate dynamic content server, sending the SMTP message and verifying that the message was actually sent.

Typically, only a minimal amount of information is actually transmitted to the recipient in the message. This minimal information usually includes standard message header information (sender information, recipient information, subject line, etc.) along with a subset of instructions (such as an HTML or XML instruction set that references the content and has the appropriate address for the content) within the body of the message. Some basic content (e.g., simple animations, background color information, text or graphic data) may also be included. The more basic content that is actually included, the larger the delivered message will be. However, the appropriate amount of basic content provides for an initial window of time in which to make a connection back to the dynamic content server maintaining the referenced content, and to receive and process content on the viewing end without delays for the recipient. In the exemplary embodiment, the desired amount of basic content includes a description of background color and headline text (such as information on the sender).

As previously mentioned, streamed content is provided to front-end CGI script 640 on dynamic content server 440 for processing and routing by front-end content daemon 645 to the appropriate storage location via an application programming interface (API). When processing and routing the streamed content data, front-end content daemon 645 causes the streamed data to be stored using methods defined by the API. Depending upon the type of content, the streamed data may be stored in differing formats. For example, audio content and video content are generally stored as ASF streams while images are typically stored in their native file format (e.g., bitmap format, JPG format, GIF format, etc.).

In one embodiment, the content is stored without regard to how the parts of the content (e.g., audio, video, images, etc.) are sent out in response to a request. For example, if the communication is an HTML based message, there are objects referenced within the set of HTML instructions actually sent with the communication. When interpreting those instructions, a request for the objects is sent to a dynamic content server. In response to such a request, each of the objects is independently streamed back to the requesting node without regarding to a sequence of the content.

However, in another embodiment, the content is stored in a manner depending upon how the content will be viewed or in a sequence depending upon when that content will appear when viewing the message. For example, a Macromedia FLASH™ message is a conventionally formatted message that indicates a sequence among the different content parts of the message. For a Macromedia FLASH™ message, the images, audio and video are synchronized in a time sequence so that each part of the content is sequenced to appear at an appropriate time when the message is viewed.

Determining the desired location for content associated with a communication is another aspect of an embodiment of the present invention that provides an advantage in helping to reduce latency and avoid congestion and delays on the recipient's end. Basically, the dynamic content is pre-positioned into a desired location on the network to optimize delivery of the dynamic content. This desired location is proximate to an anticipated access point for the particular communication that references that content. This anticipated access point is intelligently determined based on historical or sender/recipient profile information and can be subsequently or even periodically redetermined to ensure the content is maintained in an optimum network location at any given moment.

This optimized positioning and re-positioning of content is easily described using the email message example. In the embodiment where the communication is an email message, front-end content daemon 645 makes a determination of the desired location for the message's content based upon profile information on the recipient, information related to the message content, and information related to the sender. If the dynamic content has no profile nor historical access point information related to the recipient, then an estimation of the access point is done to provide the anticipated access point. If the network location information associated with the recipient if reviewed (such as the country extension in a recipient's email address) the anticipated access point may be within that particular country. This is helpful when there is a single dynamic content server deployed in that particular country. However, for countries having more than one dynamic content server deployed there, additional factors need to be considered when making such an estimation.

For a new recipient within the U.S., the estimation is made depending on factors such as the sender's own access point location, the sender's transmission patterns and a language characteristic of the message. For example, a sender composes and sends a content-rich message to a recipient without a history of accessing messages using the dynamic content server. When the server reviews a transmission history on the sender indicating that 80% of email messages transmitted from this sender are accessed in the Atlanta, Ga. area, then front-end content daemon 645 will store the content on dynamic content server 440B physically located in Atlanta, Ga. If the sender's transmission history was inconclusive or not helpful in making an intelligent estimation of the anticipated access point, then the message's content is typically stored on the dynamic content server that is closest to the front-end node from which the message was sent.

If the server scans the content itself, the server may be able to determine a language characteristic (e.g., some of the content is in the French language or that the title is written in Chinese). Those skilled in the art will realize that existing character encoding schemes, such as UNICODE, and efficient inline language determination methods provide the ability to make such a determination. Armed with this information, the dynamic content server is able to make a more intelligent assessment of the anticipated access point and a better determination of the desired location for the message's content. It is contemplated that this information along with information on the sender can be intelligently used as factors in a variety of weighted decision systems or even using an expert or artificial intelligence system as part of the dynamic content server to make the determination of the desired or optimal location for the message's content.

However, it is believed that if there is historical or profile information on the recipient, that recipient related information may be better to use (or may be used in combination with the prior discussed decision factors) when determining the desired location for the message's content.

When a recipient receives a content-rich communication (such as an email message) and accesses the communication's content, the dynamic content server (namely a content retrieval daemon 655) records and tracks the actual node from which the particular recipient is accessing the communication. Over time, the dynamic content server builds a profile of previous communication accessing activities (including parameters on node location, time of day, and the day of the week when the recipient accessed the relevant content). The efforts of the content retrieval daemon 655 to track and build this set of information on the recipient's message accessing activities can then be cleverly used by the front-end content daemon 645 when making the determination of where to store the content for a new message. For example, a profile on a recipient may indicate that during the week, the particular recipient usually accesses their email messages from Frankfurt, Germany but on the weekends they usually access their messages from Atlanta, Ga. Accordingly, a new message delivered on Saturday would have its content stored on the Atlanta area dynamic content server 440B instead of the Frankfurt area dynamic content server 440C.

Furthermore, the dynamic content servers have the advantageous ability to dynamically alter what is in the stored information and where the information is stored. The stored content may be updated to include more up-to-date information, such as the latest sales figures from a sales presentation or the latest weather forecast map or the latest fishing forecast. This can be accomplished by linking the stored content to its source so that the dynamic content server can re-access the source if desired. In the exemplary embodiment, the front-end content daemon 645 is able to determine if any of the content is to be updated while waiting to be retrieved. An indication of such a desired update status is provided by front-end client module 610 when composing and streaming the content to dynamic content server initially. If so, front-end content daemon 645 re-accesses the source of such content (e.g., third party content library database 660, text files on local content storage 412 or weather radar images on remote content storage 415).

Regarding updating or optimizing where the information is stored, the dynamic content server may subsequently or even periodically make additional determinations of the desired location for a given set of content for a communication. If the same location is determined, nothing is done. The content is already in its optimal location. However, if another server location is now the new desired location due to an updated anticipated access point, then the content is transferred to the new server location that is proximate to the new anticipated access point.

In the exemplary embodiment, front-end content daemon 645 is responsible for subsequently making additional determinations of the desired location for the content stored within user stored content database 665 and transferring the appropriate stored content to another dynamic content server as needed. While re-determining the desired location for content is typically performed by front-end content daemon 645 once per shift (i.e., three times a day), an additional optimization can be made. This optimization involves reviewing when or where (e.g., the time of day) that the intended recipient historically accesses their messages and scheduling a re-evaluation of the desired location near but prior to that time of day. In this manner, front-end content daemon 645 or a separate process running on each dynamic content server may periodically or even continually monitor content stored in user stored content database 665 and identify the appropriate time to re-evaluation the desired location for each content. At the identified time, such re-evaluations are performed and, if necessary, the related content is then transferred to another dynamic content server to help reduce latency and provide an even more robust communications delivery system. Those skilled in the art will realize that once content is transferred to other dynamic content servers, similar daemons and processes running on those servers will later re-evaluate the position of the transferred content.

Such re-evaluation of the content position can be explained using the email message example. In that example, the content for a new email message is stored in Atlanta area dynamic content server 440B. This position was selected because the particular recipient accessed their email messages from Frankfurt, Germany but on the weekends they accessed their messages from Atlanta, Ga. If the intended recipient did not read the message until the following week on Tuesday and the content remained in an Atlanta area server, the dynamic content would be relatively remote from where the recipient is likely to access the message. In order to better accommodate this recipient, the dynamic content server re-determines the desired location for the message's content on Monday and finds that the new or updated anticipated access point was now Frankfurt, Germany. Accordingly, the content stored on the Atlanta area dynamic content server 440B is transferred to the Frankfurt area dynamic content server 440C. In this manner, the system provides for dynamic content and dynamic updating of where such content is located on the network.

It is also contemplated that the functionality provided by a dynamic content server (such as dynamic content server 440) and a conventional mail server (such as mail server 430) may be incorporated into a single physical server (such as dynamic content server 440). In such a configuration, it is possible that a conventional SMTP message and its associated content are sent to the same node. The SMTP message maybe conventionally routed and processed for delivery to the email client node requesting the message. However, in this configuration, it is further contemplated that both the SMTP message and its contents may be pre-positioned in an optimal network location and transferred to better network locations depending upon an anticipated access point for the message. In this manner, the intended recipient can advantageously, efficiently and quickly deliver and access both the message and the message's content.

In addition to these updating and optimizing features, dynamic content server 440 is also able to provide a variety of tracking features related to the content. The dynamic content server (typically via content retrieval daemon 655) can track when the content has been requested and from where (e.g., the IP address of the requesting email client node). If the recipient forwards the message to another recipient, that recipient must send another request for the content to the dynamic content server. The dynamic content server can allow or prevent content from being forwarded to anyone other than the intended recipient. The sender may indicate when composing the message that the message's content is sensitive and should not be forward to others. When streaming that content to dynamic content server, front-end client module 610 communicates this restriction to front-end content daemon 645, which forwards this restriction information to content retrieval daemon 655. When another recipient attempts to get the restricted content by sending a request to email client CGI script 650 which is then handled by content retrieval daemon 655, the content is not streamed back out to the requesting email client node.

Similarly, an auto-deleting feature can be implemented within a dynamic content server to automatically delete content associated with a particular message. For example, the content may be composed on the front-end client module to have a limited shelf-life. If so, front-end client module 610 sends an indication of such a shelf life to dynamic content server when streaming the content to it and after a designated amount of time, the content is deleted from the user stored content database 665. Alternatively, the content may be set to delete after a designated number of accesses instead of after the designated amount of time. If the email client independently deletes the message prior to viewing the content, an indicator is preferably sent back to the dynamic content server so that the user-created dynamic content stored in the user stored content database 665 can be deleted.

The dynamic content server may also be implemented to handle security protocols related to the content. Some of the content may be personal, confidential or proprietary. The dynamic content server (as well as the front-end client module 610 and the receiving email client module 670) may use custom or commercially available security protocols that may be overlaid onto content streams as they exit the front-end node 405 and the dynamic content server 440 in order to provide a secure email environment. In the exemplary embodiment, a conventional triple DES security protocol is preferred to be overlaid on outgoing streams of content to provide secure messaging. Other security protocols may be used as well.

In the exemplary embodiment of the present invention, when the intended recipient uses email client module 670 to receive the message from mail server 430, the email client module 670 gets the message having a minimized amount of information included within it. This minimal information typically includes an HTML instruction set defining the layout for the body of the message and referencing particular content stored in user stored content database 665 on dynamic content server 440. Those skilled in the art will understand that an HTML instruction set is essentially a set of instructions defining the layout and content within that layout using HTML terms. However, an embodiment of the present invention contemplates using any type of instruction set or, more broadly described, any kind of information that references the content associated with the email message as the minimal information sent with the email message.

Some basic content may also include the minimal information received. In one embodiment of the present invention, the basic content contains content describing the background graphics for the body of the email message, a graphical representation of information on the sender (such as the sender's name and email address) along with a short animation, such as a series of bubbles appearing (as illustrated in FIGS. 3A–3B). In this manner, email client module 670 can display this basic content to provide the illusion of seamless speed and no delays while the module 670 is requesting and processing the streamed content from the dynamic content server. In the exemplary embodiment, it is desired to have approximately one to two seconds worth of data as basic content. However those skilled in the art will appreciate that the desired amount of basic content will vary depending on the network topology and the email client node's proximity to the appropriate dynamic content server. Using such basic content in conjunction with the main content located on the dynamic content server, latency can be further minimized in conjunction with pre-positioning of the content on different servers within the network.

Once the minimal set of information is received by email client module 670, the information is analyzed and interpreted to determine information about the body of message. This determined information includes the header information for the message (e.g., sender information, recipient information, and subject line information) and references to content stored on the dynamic content server 440. Email client module 670 then attempts to access the content by generating a request that is sent over an HTTP network connection to the dynamic content server 440.

In the exemplary embodiment, a proxy server (not shown) sits between email client module 670 and dynamic content server 440. The proxy server intercepts all requests to the dynamic content server 440 to see if the it can fulfill the request from local storage without having to access the real server (i.e., dynamic content server 440). The proxy server is preferably implemented as a conventional SQUID proxy cache available from vendors such as Pushcache.com, Inc., Austin, Tex. and Industrial Code and Logic located in Cambridge, Ontario, Canada.

Thus, the proxy server determines if the requested content is located locally on the email client node 435. If the requested content is stored locally, a reference is returned to the requesting daemon that is part of email client module 670. Otherwise, the proxy server sends a request to a content server (typically the nearest dynamic content server 440) where the content is located.

On the content server side, the request is received by email client CGI script 650 and passed onto content retrieval daemon 655. Content retrieval daemon 655 queries and gathers the appropriate content from user stored content database 665. If the requested content is located on another content server, then the correct user stored content database is accessed to gather the requested content. The content is then provided in a stream back to the requesting email client module 670 through the proxy server. The requested content is typically stored within the proxy server's local storage in a least used memory queue so that future requests may be locally served. The least used memory queue operates to keep popularly requested content while discarding and writing over less frequently requested content.

Figure 7:
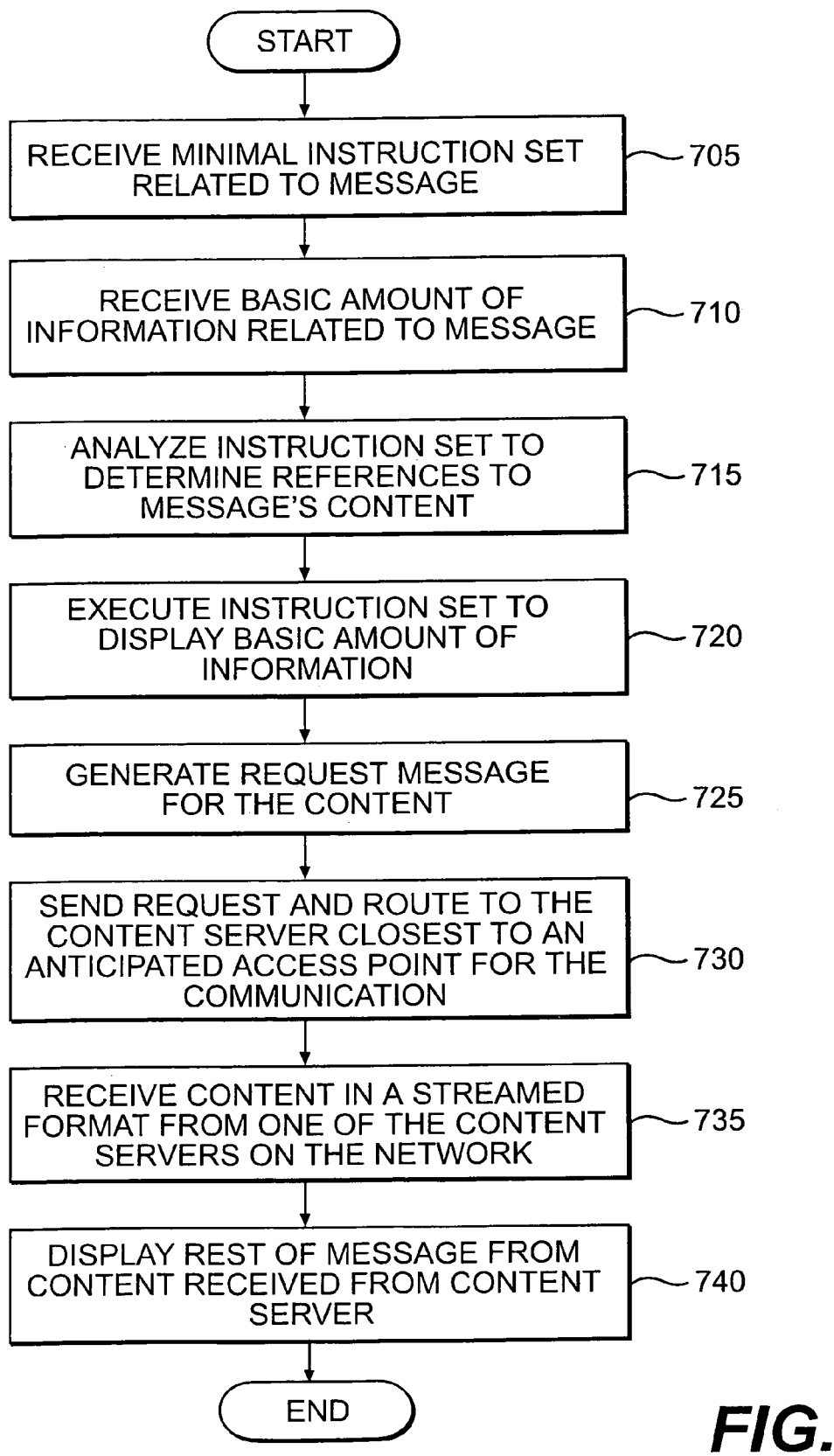
FIG. 7 is a flowchart illustrating typical steps for receiving a communication using one or more content servers in a network consistent with an embodiment of the present invention.

Further details on steps of exemplary methods for receiving and viewing the content associated with a content-rich communication (such as an email message) in accordance with an embodiment of the present invention will now be explained with reference to an exemplary flowchart of FIG. 7. Referring now to the email message example and the flowchart of FIG. 7, method 700 begins at step 705 where part of the message is received. In general, the intended recipient for the message receives a portion of the message while another portion of the message is stored on one of the content servers. In particular, a minimal instruction set is received at step 705. In the exemplary embodiment, the minimal instruction set is an HTML instruction set defining a framework for the content and includes references to specific pieces of content for viewing in designated locations of the framework.

Typically, the minimal instruction set is accompanied by a basic amount of information (also called basic content) that is received at step 715. This basic content provides a relatively small amount of content for immediate processing and viewing while the content stored on the dynamic content server is being accessed.

At step 715, the instruction set is analyzed to determine the references to the message's content. At step 720, the instruction set is executed to display the basic amount of information while the remaining steps in method 700 advantageously request and receive the referenced content from a server on the network, such as one of the dynamic content servers. In the exemplary embodiment, the basic content sent along with the instruction set is used by the receiving node to cause a background color and information regarding the sender of the message to be displayed on the node's screen as illustrated in FIGS. 3A–3C. In this manner, the information received within the message is interpreted to identify the content.

At step 725, a request message is generated for the content. In the exemplary embodiment, the request message is an HTTP formatted request directed toward a dynamic content server for the referenced content. In the exemplary embodiment, the local memory storage allocated to the proxy server is checked first to see if the requested content is somehow in its memory queue. However, if the proxy server does not have the requested content, step 725 proceeds to step 730.

At step 730, the request message is sent out. The request is routed to one of the content servers (such as dynamic content server 440) on the network. In particular, the request is sent to the content server that is closest to anticipated access point for the communication. When the actual access point for the communication (such as email client node 435C) is the anticipated access point for the communication, individually staging or positioning the content for that particular communication on a content server closest to that node helps address problems of latency and congested traffic on the network.

The content server receives the request message, processes the request, locates the content associated with the request message and sends the content back to the requesting network node (such as email client node 435C). At step 735, the requesting node receives the content in a streamed format from one of the content servers on the network. In the exemplary embodiment, the content is streamed according to a streaming protocol, such as ASF.

At step 740, the streamed content is received by the requesting node and processed to display the rest of the message. Typically, the streamed content is sent to the requesting node by the content server that is the closest to the requesting node in order to reduce the time it takes to access and stream the content out to the intended recipient. Depending upon expected latency times when accessing such content, the amount of basic content and the amount of content kept on the content server can be varied to optimize downloading time while still avoiding delays or disjointed playback when viewing a message.

The foregoing description of embodiments of the invention has been presented for purposes of illustration and description. It is not exhaustive and does not limit the invention to the precise form disclosed. Modifications and variations are possible in light of the above teachings or may be acquired from practicing of the invention. For example, the described implementation includes a particular network configuration but the present invention may be implemented in a variety of data communication network environments using software, hardware or a combination of hardware and software to provide the receiving, accessing, and streaming functionality.

While the above described embodiment of the present invention was implemented as part of an electronic mail composing, delivery and viewing system, the principles of the present invention are not limited to electronic mail implementations. Those skilled in the art will easily realize that the principles of the present invention are applicable to other communications beyond electronic mail (such as broadband communication between interactive set top transceivers, wireless communication with handheld devices, etc.)

Those skilled in the art will also appreciate that all or part of systems and methods consistent with the present invention may be stored on or read from other computer-readable media, such as secondary storage devices, like hard disks, floppy disks, and CD-ROM; a carrier wave received from the Internet; or other forms of computer-readable memory, such as read-only memory (ROM) or random-access memory (RAM). Although specific components of the dynamic content delivery system 500 have been described, one skilled in the art will appreciate that a system suitable for use with the exemplary embodiment may contain additional or different components (such as multiple processors, routers or subnetworks) and a variety of input/output devices and program modules.

Furthermore, one skilled in the art will also realize that the program modules illustrated in FIG. 6 (e.g., front-end client module 610, email client module 670, CGI scripts 640, 650 and content daemons 645, 655) may be implemented in a variety of ways and include multiple other modules, programs, applications, scripts, processes, threads, or code sections that all functionally interrelate with each other to accomplish the individual tasks described above for each module, script, and daemon. For example, it is contemplated that these programs modules may be implemented using commercially available software tools, using custom object-oriented code written in the C++ programming language, using applets written in the Java programming language, or may be implemented as with discrete electrical components or as one or more hardwired application specific integrated circuits (ASIC) custom designed just for this purpose.

Therefore, the scope of the invention is defined strictly by the claims and their equivalents.

What is claimed is:

1. A method for receiving content of an email communication within a network, comprising the steps of:
   receiving information associated with the email communication, the information referencing content stored on one of a plurality of content servers on the network;
   determining the one of the content servers by choosing the one of the content servers closest to an anticipated access point for the email communication, where the closest content server is determined based on a recipient's message accessing profile and the recipient's domain name;
   accessing the referenced content from the one of the content servers; and
   displaying the email communication using the received information and the accessed content.

2. The method of claim 1, wherein the receiving information step further comprises:
   analyzing the received information to determine an instruction set associated with the email communication, the instruction set having at least one reference to the content; and
   executing the instruction set to display an initial part of the email communication.

3. The method of claim 2, wherein the accessing step further comprises:
   requesting the content in response to the step of executing the instruction set having the at least one reference to the content; and
   receiving the content from the one of the content servers.

4. The method of claim 3, wherein the requesting step further comprises:
   generating a request for the content; and
   sending the request to the one of the content servers.

5. The method of claim 4, wherein the receiving step further comprises receiving the content from the one of the content servers in a predefined streaming format.

6. The method of claim 5, wherein the receiving step further comprises receiving a stream of data representing the content from the one of the content servers and processing the received stream of data before displaying the received stream of data.

7. A system in a network for receiving an email communication, comprising:
   a processor;
   a display device coupled to the processor;
   a communications interface coupling the processor to the network; and
   the processor being operative to
      receive information associated with the email communication, the information referencing content stored on one of a plurality of content servers
      determine the one of the content servers by choosing the one of the content servers closest to an anticipated access point for the email communication, where the closest content server is determined based on a recipient's message accessing profile and the recipient's domain name;

access the referenced content on the one of the content servers through the communications interface, and cause the email communication to be displayed on the display device using the received information and the accessed content.

8. The system of claim 7, wherein the processor is further operative to:

determine an instruction set based upon the received information, the instruction set being associated with the email communication and having at least one reference to the content; and execute the instruction set to cause an initial part of the email communication to be displayed on the display device while the referenced content is accessed on the one of the content servers.

9. The system of claim 8, wherein the processor is further operative to generate a request for the content and send the request to the one of the content servers through the communications interface.

10. The system of claim 9, wherein the communication interface is operative to receive the requested content in a predefined streamed format from the one of the content servers.

11. The system of claim 10, wherein the communications interface is further operative to provide the content in the predefined streamed format to the processor; and wherein the processor is further operative to receive the content from the communications interface and process the content to cause the content to be displayed on the display device.

12. A computer-readable medium containing instructions for receiving an email communication using a plurality of content servers within the network, which when executed, the instructions comprising the steps of:

receiving at least one reference to content associated with the email communication storing the content on one of the content servers closest to an anticipated access point for the email communication, where the closest content server is determined based on a recipient's message accessing profile and the recipient's domain name;

receiving a basic amount of information associated with the email communication;

displaying a first part of the email communication using the basic amount of information;

accessing the content on the one of the content servers; and displaying a second part of the email communication using the accessed content.

13. The computer-readable medium of claim 12, wherein the step of displaying the first part of the email communication further comprises displaying a background color of the email communication.

14. The computer-readable medium of claim 12, wherein the step of displaying the first part of the email communication further comprises displaying an animated portion of the email communication.

15. The computer-readable medium of claim 12, wherein the step of displaying the first part of the email communication further comprises displaying a graphical representation of information on the sender of the email communication.

16. The computer-readable medium of claim 12, wherein the accessing step further comprises:

generating a request for the content based upon the at least one reference to the content;

sending the request to the one of the content servers which locates the content; and receiving the content from the one of the content servers.

17. The computer-readable medium of claim 16, wherein the receiving step further comprises receiving the content directly from the one of the content servers without transferring the content to another of the content servers.

18. The computer-readable medium of claim 16, wherein the receiving step further comprises receiving the content from the one of the content servers in a predefined streaming format.

\* \* \* \* \*